US012347972B2

(12) United States Patent
Kusaka

(10) Patent No.: US 12,347,972 B2
(45) Date of Patent: Jul. 1, 2025

(54) CONNECTOR DEVICE

(71) Applicant: HIROSE ELECTRIC CO., LTD., Kanagawa (JP)

(72) Inventor: Kenta Kusaka, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 313 days.

(21) Appl. No.: 18/315,666

(22) Filed: May 11, 2023

(65) Prior Publication Data

US 2023/0411905 A1 Dec. 21, 2023

(30) Foreign Application Priority Data

May 19, 2022 (JP) ................................ 2022-082491

(51) Int. Cl.
*H01R 13/639* (2006.01)
*H01R 12/71* (2011.01)

(52) U.S. Cl.
CPC ......... *H01R 13/639* (2013.01); *H01R 12/716* (2013.01)

(58) Field of Classification Search
CPC ..... H01R 13/639; H01R 12/52; H01R 12/716
USPC .................................................. 439/74, 345
See application file for complete search history.

(56) References Cited

U.S. PATENT DOCUMENTS

| | | | | |
|---|---|---|---|---|
| 8,083,527 B2 * | 12/2011 | Takeuchi | H01R 12/73 | 439/74 |
| 8,272,881 B2 * | 9/2012 | Miyazaki | H01R 12/716 | 439/74 |
| 8,758,029 B2 * | 6/2014 | Midorikawa | H01R 12/716 | 439/74 |
| 2007/0141867 A1 * | 6/2007 | Kishi | H01R 12/716 | 439/74 |
| 2018/0294586 A1 * | 10/2018 | Tanaka | H01R 12/52 | |

FOREIGN PATENT DOCUMENTS

| | | | |
|---|---|---|---|
| CN | 101295833 B * | 3/2011 | H01R 12/716 |
| JP | 2008305796 A * | 12/2008 | H01R 12/52 |
| JP | 2016149374 A | 8/2016 | |

* cited by examiner

*Primary Examiner* — Gary F Paumen
(74) *Attorney, Agent, or Firm* — RANKIN, HILL & CLARK LLP

(57) ABSTRACT

Provided is a connector device including: a first connector; and a second connector connected to the first connector. The first connector includes a first terminal, a first lock member, and a first housing. The second connector includes a second terminal, a second lock member, and a second housing. The first housing has a first plate portion, a first inner protruding portion, a first outer protruding portion, a first inner space, and a first outer space. The second housing has a second plate portion, a second inner protruding portion, a second outer protruding portion, and a second inner space. The first lock member has a first inner lock portion and a first outer lock portion. The second lock member has a second inner lock portion locked to the first inner lock portion and a second outer lock portion locked to the first outer lock portion.

10 Claims, 15 Drawing Sheets

CONNECTOR DEVICE

CROSS-REFERENCE TO RELATED APPLICATION

This application claims priority from Japanese Patent Application No. 2022-082491 filed with the Japan Patent Office on May 19, 2022, the entire content of which is hereby incorporated by reference.

BACKGROUND

1. Technical Field

The present disclosure relates to a connector device.

2. Related Art

A connector device capable of directly connecting two boards arranged so as to overlap with each other has been broadly used for, inter alia, electronic equipment. The connector device of this type includes a plug and a receptacle connectable to each other such that the plug is inserted into or removed from the receptacle. The plug is attached to one of the two boards, and the receptacle is attached to the other board.

Any of the plug and the receptacle includes a terminal and a housing holding the terminal. The housing of the plug is formed in a substantially rectangular parallelepiped shape, and is placed on one board such that a lower surface thereof faces the one board. Moreover, e.g., a raised portion is formed on an upper surface of the housing of the plug, and one end portion of the terminal of the plug is arranged on the raised portion. The other end portion of the terminal of the plug is arranged on the lower surface of the housing of the plug, and is connected to a circuit on the one board.

On the other hand, the housing of the receptacle is also formed in a substantially rectangular parallelepiped shape, and is placed on the other board such that a lower surface thereof faces the other board. Moreover, e.g., a recessed portion is formed on an upper surface of the housing of the receptacle, and one end portion of the terminal of the receptacle is arranged in the recessed portion. The other end portion of the terminal of the receptacle is arranged on the lower surface of the housing of the receptacle, and is connected to a circuit on the other board.

The raised portion formed on the housing of the plug is fitted in the recessed portion formed at the housing of the receptacle with the upper surface of the housing of the plug and the upper surface of the housing of the receptacle facing each other, and in this manner, the one end portion of the terminal of the plug and the one end portion of the terminal of the receptacle contact each other. By connection between the plug and the receptacle as described above, the circuit on the one board and the circuit on the other board are electrically connected to each other.

Some connector devices of this type have a lock function of locking the plug and the receptacle to each other. Locking the plug and the receptacle to each other means that a state of the plug and the receptacle being connected to each other is held by retaining of the plug and the receptacle after the plug and the receptacle have been connected to each other.

JP-A-2016-149374 describes a receptacle connector (1) and a plug connector (2) for circuit boards, the receptacle connector (1) and the plug connector (2) having a lock function. Specifically, the receptacle connector (1) includes a receptacle terminal (20) and a receptacle lock fitting (30), the receptacle terminal (20) is formed with a lock recessed portion (23A-1), and the receptacle lock fitting (30) is formed with a lock recessed portion (35A). The plug connector (2) includes a plug terminal (60) and a plug lock fitting (70), the plug terminal (60) is formed with a lock target step portion (61A-1), and the plug lock fitting (70) is formed with a lock target step portion (71A). When the receptacle connector (1) and the plug connector (2) are connected to each other, the lock recessed portion (23A-1) of the receptacle terminal (20) and the lock target step portion (61A-1) of the plug terminal (60) are locked to each other, and the lock recessed portion (35A) of the receptacle lock fitting (30) and the lock target step portion (71A) of the plug lock fitting (70) are locked to each other. In this manner, the receptacle connector (1) and the plug connector (2) are retained. Note that a reference numeral in parentheses is a reference numeral used in JP-A-2016-149374.

SUMMARY

The connector device according to an embodiment of the present disclosure includes: a first connector; and a second connector connected to the first connector. The first connector includes a first terminal, a first lock member, and a first housing. The second connector includes a second terminal, a second lock member, and a second housing. The first housing has a first plate portion, a first inner protruding portion protruding upward from the first plate portion, a first outer protruding portion protruding upward from the first plate portion and surrounding the first inner protruding portion, a first inner space surrounded by the first inner protruding portion, and a first outer space between the first inner protruding portion and the first outer protruding portion. The second housing has a second plate portion, a second inner protruding portion protruding upward from the second plate portion, a second outer protruding portion protruding upward from the second plate portion and surrounding the second inner protruding portion, and a second inner space between the second inner protruding portion and the second outer protruding portion. When the first connector and the second connector are connected to each other, the second inner protruding portion enters the first inner space, the first inner protruding portion enters the second inner space, and the second outer protruding portion enters the first outer space. One end portion of the first terminal is arranged on the first inner protruding portion, and another end portion of the first terminal is arranged on the first plate portion. One end portion of the second terminal is arranged in the second inner space, and another end portion of the second terminal is arranged on the second plate portion. The first lock member has a first inner lock portion arranged on an outer surface of the first inner protruding portion and a first outer lock portion arranged on an inner surface of the first outer protruding portion. The second lock member has a second inner lock portion arranged on an inner surface of the second outer protruding portion and locked to the first inner lock portion and a second outer lock portion arranged on an outer surface of the second outer protruding portion and locked to the first outer lock portion.

DETAILED DESCRIPTION

Figure 1A:
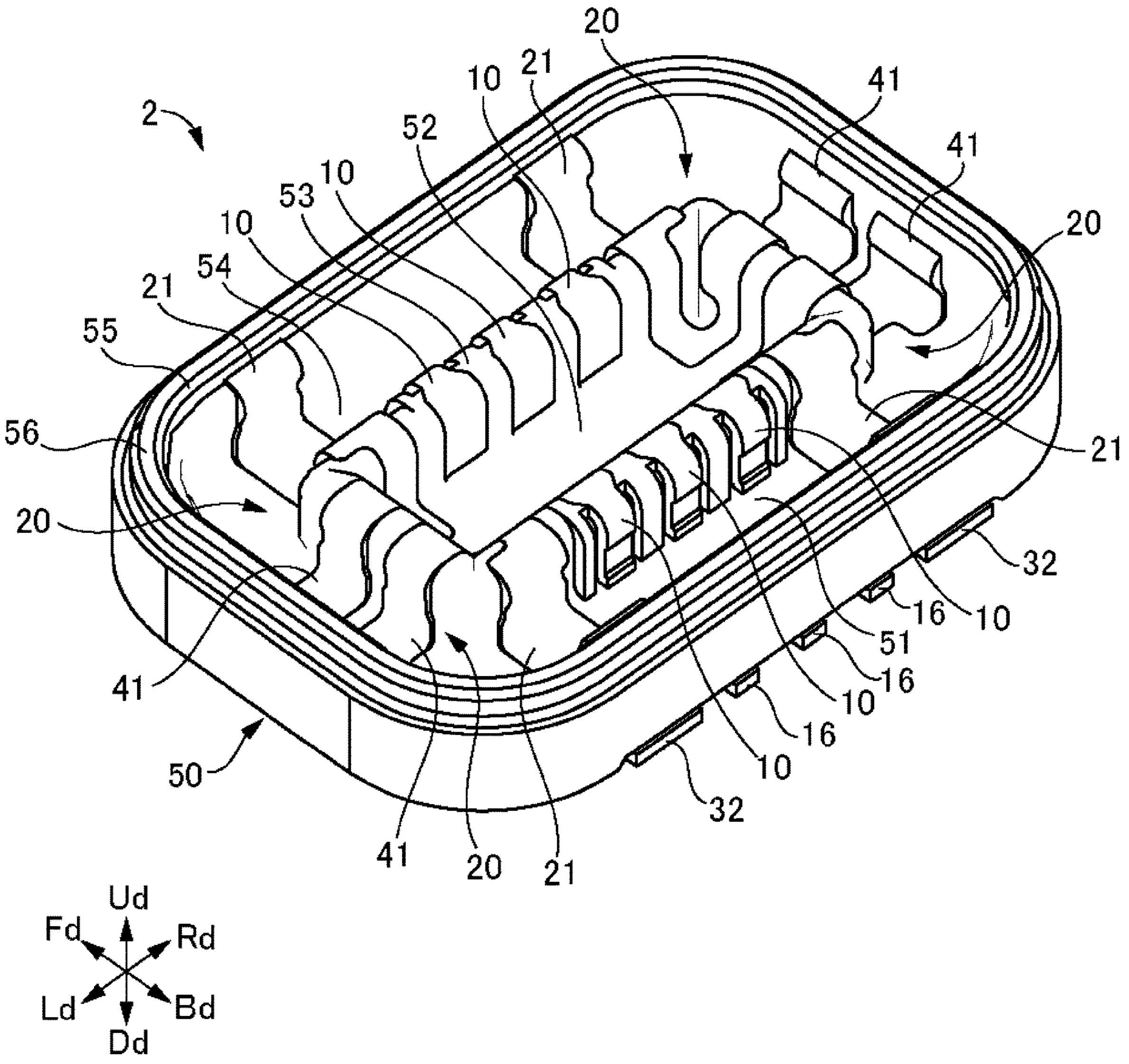
FIGS. 1A and 1B are perspective views showing a plug and a receptacle in a connector device of an embodiment of the present disclosure, FIG. 1A showing the state of the plug from the upper left back side and FIG. 1B showing the state of the receptacle from the upper left back side.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to enhance vibration resistance or impact resistance of electronic equipment, the strength of lock between the plug and the receptacle of the connector device used for the electronic equipment needs to be enhanced.

An object of the present disclosure is to provide a connector device capable of enhancing the strength of lock between a plug and a receptacle.

The connector device according to the present disclosure includes: a first connector; and a second connector connected to the first connector. The first connector includes a first terminal, a first lock member, and a first housing. The second connector includes a second terminal, a second lock member, and a second housing. The first housing has a first plate portion, a first inner protruding portion protruding upward from the first plate portion, a first outer protruding portion protruding upward from the first plate portion and surrounding the first inner protruding portion, a first inner space surrounded by the first inner protruding portion, and a first outer space between the first inner protruding portion and the first outer protruding portion. The second housing has a second plate portion, a second inner protruding portion protruding upward from the second plate portion, a second outer protruding portion protruding upward from the second plate portion and surrounding the second inner protruding portion, and a second inner space between the second inner protruding portion and the second outer protruding portion. When the first connector and the second connector are connected to each other, the second inner protruding portion enters the first inner space, the first inner protruding portion enters the second inner space, and the second outer protruding portion enters the first outer space. One end portion of the first terminal is arranged on the first inner protruding portion, and another end portion of the first terminal is arranged on the first plate portion. One end portion of the second terminal is arranged in the second inner space, and another end portion of the second terminal is arranged on the second plate portion. The first lock member has a first inner lock portion arranged on an outer surface of the first inner protruding portion and a first outer lock portion arranged on an inner surface of the first outer protruding portion. The second lock member has a second inner lock portion arranged on an inner surface of the second outer protruding portion and locked to the first inner lock portion and a second outer lock portion arranged on an outer surface of the second outer protruding portion and locked to the first outer lock portion.

The connector device of the present disclosure may be configured in such a manner that: the first lock member is formed of a metal plate held on the first housing; the first lock member has a first outer extending portion extending, between the inner surface of the first outer protruding portion and the outer surface of the first inner protruding portion, from an outside to an inside on an upper surface of the first plate portion, a first inner upwardly-extending portion extending upward from an inner end portion of the first outer extending portion on the outer surface of the first inner protruding portion, and a first outer upwardly-extending portion extending upward from an outer end portion of the first outer extending portion on the inner surface of the first outer protruding portion; and the first inner lock portion is provided at the first inner upwardly-extending portion; and the first outer lock portion is provided at the first outer upwardly-extending portion.

Also, the first lock member may further have a first outermost extending portion extending from the inside to the outside from an upper end portion of the first outer upwardly-extending portion on an upper surface of the first outer protruding portion or in the first outer protruding portion, a first outer downwardly-extending portion extending downward from an outer end portion of the first outermost extending portion to a lower surface of the first plate portion in the first outer protruding portion, and a first lower extending portion extending from a lower end portion of the first outer downwardly-extending portion on the lower surface of the first plate portion.

In addition, the second lock member may be formed of a metal plate held on the second housing. The second lock member may have a second outer extending portion extending from an outside to an inside on an upper surface of the second outer protruding portion, a second inner downwardly-extending portion extending downward from an inner end portion of the second outer extending portion on the inner surface of the second outer protruding portion, and a second outer downwardly-extending portion extending downward from an outer end portion of the second outer extending portion on the outer surface of the second outer protruding portion. The second inner lock portion may be provided at the second inner downwardly-extending portion, and the second outer lock portion is provided at the second outer downwardly-extending portion.

Additionally, the second lock member may further have a second lower extending portion extending on a lower surface of the second plate portion after having extended from a lower end portion of the second outer downwardly-extending portion to the lower surface of the second plate portion.

Moreover, the first connector may include a plurality of the first lock members, one of the plurality of the first lock members may be provided at a position on one side of the first inner space in the first outer space, and another one of the plurality of the first lock members may be provided at a position on another side of the first inner space in the first outer space The second connector may include a plurality of the second lock members, one of the plurality of the second lock members may be provided at a position on one side of the second inner protruding portion at the second outer protruding portion, and another one of the plurality of the second lock members may be provided at a position on another side of the second inner protruding portion at the second outer protruding portion.

Furthermore, the first connector may include a plurality of the first lock members, one of the plurality of the first lock members may be provided at a portion extending in a right-left direction in the first outer space, and another one of the plurality of the first lock members may be provided at a portion extending in a front-back direction in the first outer space. The second connector may include a plurality of the second lock members, one of the plurality of the second lock members may be provided at a portion extending in the right-left direction at the second outer protruding portion, and the another one of the plurality of the second lock members may be provided at a portion extending in the front-back direction at the second outer protruding portion.

Also, the first connector may include a first combination lock member configured such that the one of the plurality of the first lock members and the another one of the plurality of the first lock members are coupled to each other, and the first combination lock member may be formed of a single metal plate. The one of the plurality of the first lock members is a first lock member provided at a portion extending in the right-left direction in the first outer space, and the another one of the plurality of first lock members is a first lock member provided at a portion extending in the front-back direction in the first outer space.

In addition, the second connector may include a second combination lock member configured such that the one of the plurality of the second lock members and the another one of the plurality of the second lock members are coupled to each other, and the second combination lock member may be formed of a single metal plate. The one of the plurality of the second lock members is a second lock member provided at a portion extending in the right-left direction at the second outer protruding portion, and the another one of the plurality of the second lock members is a second lock member provided at a portion extending in the front-back direction at the second outer protruding portion.

Moreover, the second combination lock member may have a coupling portion coupling the one of the plurality of the second lock members and the another one of the plurality of the second lock members to each other, and the coupling portion may extend on an outer surface of a corner portion of the second outer protruding portion.

According to the present disclosure, the strength of lock between the plug and the receptacle can be enhanced.

Hereinafter, an embodiment of the present disclosure will be described with reference to the drawings. Note that in the embodiment, an up (Ud), down (Dd), front (Fd), back (Bd), left (Ld), or right (Rd) direction will be described according to arrows shown on the lower left side in FIGS. 1 and 3 to 16.

(Connector Device)

Figure 1B:
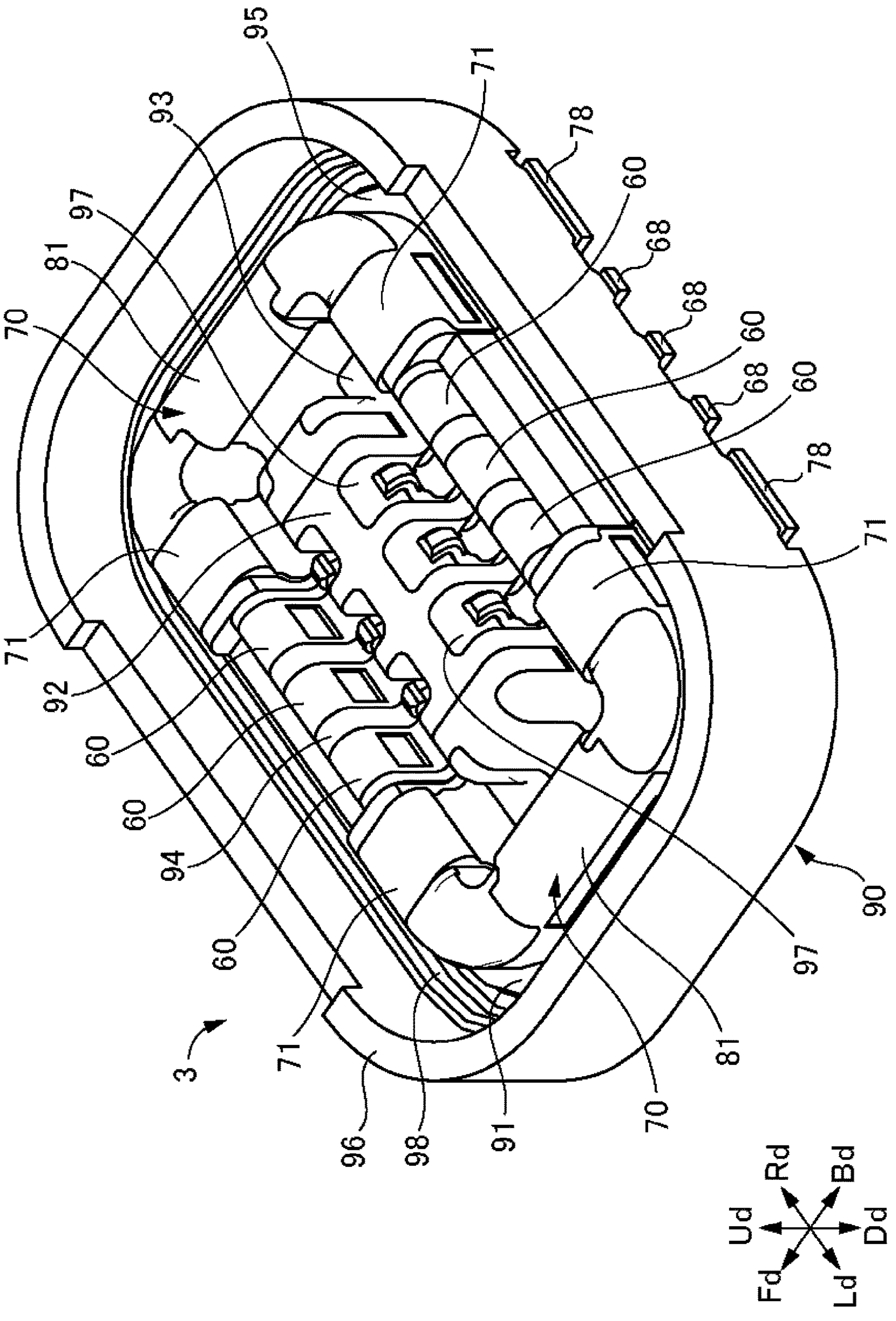
Figure 2:
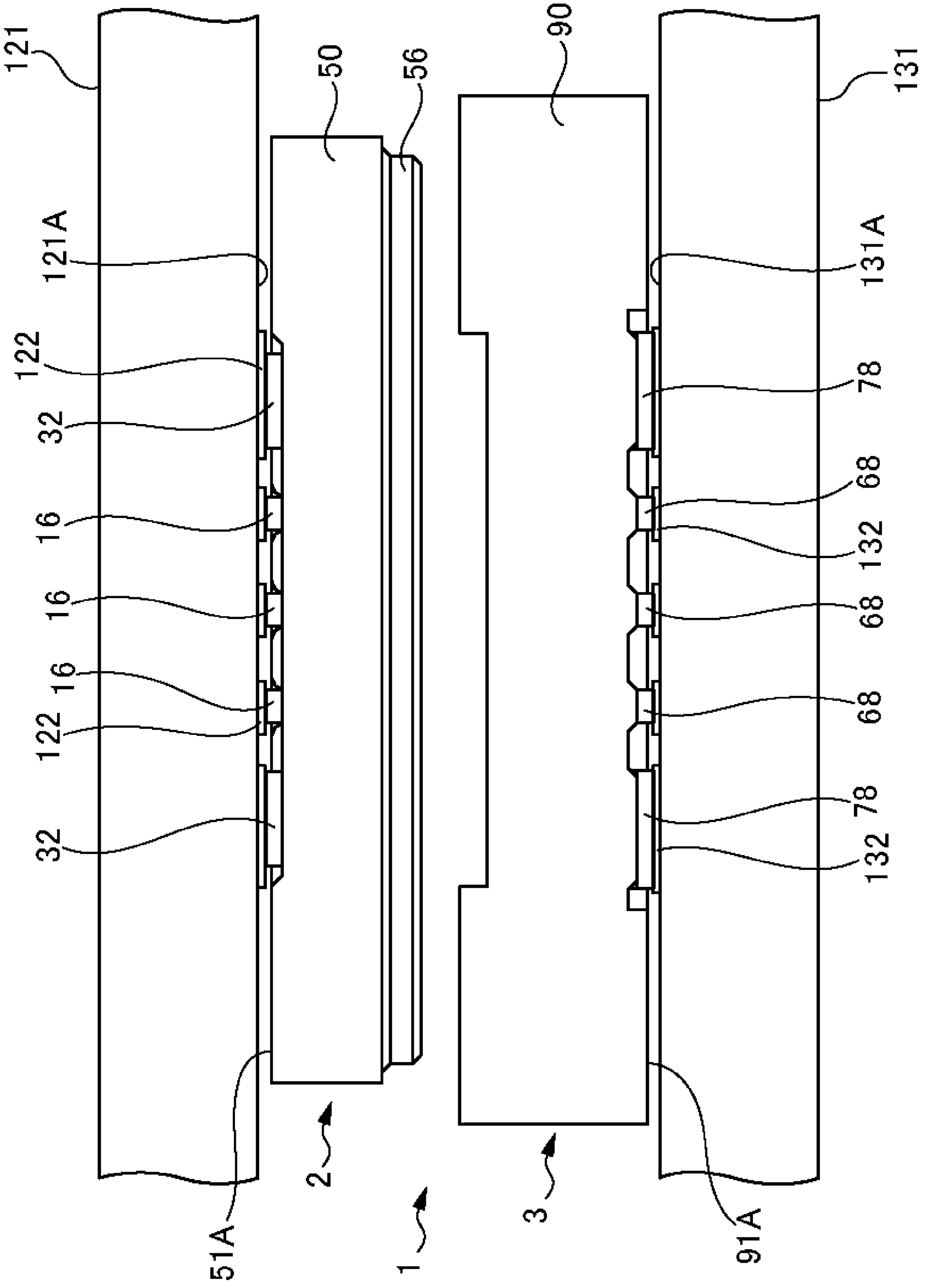
FIG. 2 is a view describing a state immediately before the plug and the receptacle in the connector device of the embodiment of the present disclosure are connected to each other.

FIG. 1A shows a plug 2 in a connector device 1 of the embodiment of the present disclosure, and FIG. 1B shows a receptacle 3 in the connector device 1. FIG. 2 shows a state immediately before the plug 2 mounted on a board 121 and the receptacle 3 mounted on a board 131 are connected to each other.

The connector device 1 is a connector device that connects two boards to each other. The connector device 1 includes the plug 2 and the receptacle 3 connectable to each other such that the plug 2 is inserted into or removed from the receptacle 3. According to the connector device 1, the two boards 121, 131 arranged so as to overlap with each other can be directly connected to each other, for example, in such a manner that the plug 2 and the receptacle 3 are connected to each other with the plug 2 mounted on the board 121 and the receptacle 3 mounted on the board 131, as shown in FIG. 2. Note that the plug 2 is a specific example of a "first connector," and the receptacle 3 is a specific example of a "second connector." Moreover, the board 121 is a specific example of a "first board," and the board 131 is a specific example of a "second board."

Hereinafter, in description of the plug 2, the side of the plug 2 facing a mount surface 121A of the board 121 upon mount on the board 121 will be referred to as a lower side, and the side facing the receptacle 3 upon connection to the receptacle 3 will be referred to as an upper side. Moreover, in description of the receptacle 3, the side of the receptacle 3 facing a mount surface 131A of the board 131 upon mount on the board 131 will be referred to as a lower side, and the side facing the plug 2 upon connection to the plug 2 will be referred to as an upper side. Note that the plug 2 in FIG. 2 is in a vertically-inverted state.

(Plug)

Figure 3:
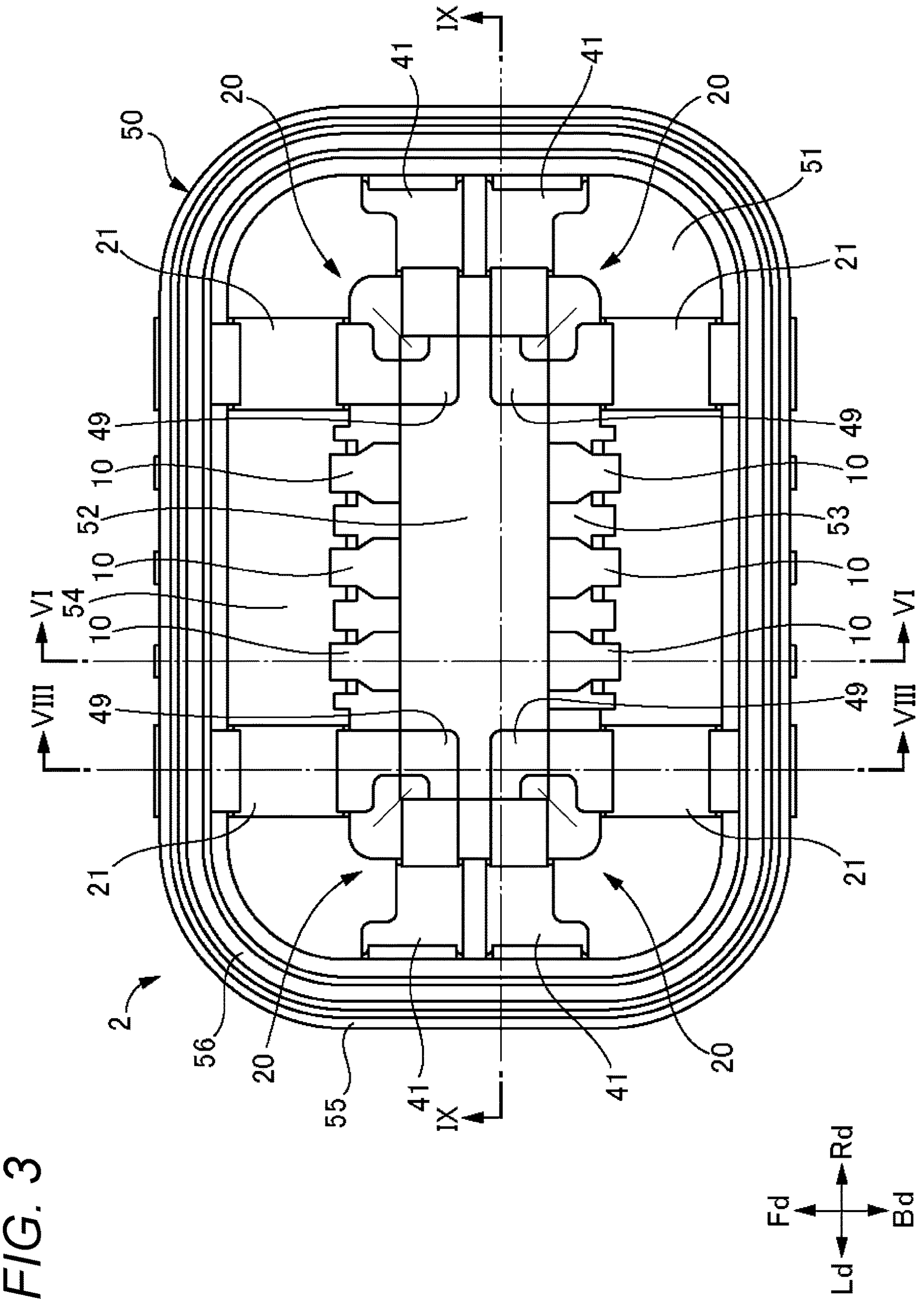
FIG. 3 is an external view showing, from above, the state of the plug in the connector device of the embodiment of the present disclosure.

FIG. 3 shows the state of the plug 2 from above. As shown in FIG. 3, the plug 2 includes six terminals 10, four combination lock members 20, and a housing 50 holding the terminals 10 and the combination lock members 20. The plug 2 is formed by insert molding. Specifically, after the terminals 10 and the combination lock members 20 have been loaded in a die, the inside of the die is filled with a material having insulating properties, such as resin, and in this manner, the housing 50 is molded. In this manner, the plug 2 is formed such that the terminals 10, the combination lock members 20, and the housing 50 are integrated. Note that each terminal 10 is a specific example of a "first terminal," each combination lock member 20 is a specific example of a "first combination lock member," and the housing 50 is a specific example of a "first housing."

(Housing of Plug)

As shown in FIG. 1A, the housing 50 of the plug 2 is formed in a substantially rectangular parallelepiped shape from the material having the insulating properties, such as resin, e.g., liquid crystal polymer. The housing 50 has a bottom plate portion 51, an inner space 52, an inner protruding portion 53, an outer space 54, and an outer protruding portion 55. Note that the bottom plate portion 51 is a specific example of a "first plate portion" and the inner space 52 is a specific example of a "first inner space." Moreover, the inner protruding portion 53 is a specific example of a "first inner protruding portion," the outer space 54 is a specific example of a "first outer space," and the outer protruding portion 55 is a specific example of a "first outer protruding portion."

The bottom plate portion 51 is a plate-shaped portion forming the bottom of the housing 50. When the plug 2 is mounted on the board 121, the plug 2 is placed on the mount surface 121A such that a lower surface 51A of the bottom plate portion 51 faces the mount surface 121A of the board 121 (see FIG. 2). The inner space 52 is provided at the center in the front-back direction and the right-left direction on the bottom plate portion 51. The inner protruding portion 53 protrudes upward from the bottom plate portion 51, and surrounds the outside of the inner space 52 across the entire circumference thereof. The outer space 54 is provided outside the inner protruding portion 53 on the bottom plate portion 51, and surrounds the outside of the inner protruding portion 53 across the entire circumference thereof. The outer protruding portion 55 protrudes upward from the bottom plate portion 51, and surrounds the outside of the outer space 54 across the entire circumference thereof. That is, the outer space 54 is a space provided between the inner protruding portion 53 and the outer protruding portion 55.

As shown in FIG. 3, as viewed from above the housing 50, each of the inner protruding portion 53 and the outer protruding portion 55 is formed in the shape of a rectangular ring having a rectangular outer shape longer in the right-left direction than in the front-back direction. Moreover, the center of the inner protruding portion 53 and the center of the outer protruding portion 55 are coincident with each other. A long-side portion (portion extending in the right-left direction) of the inner protruding portion 53 and a long-side portion of the outer protruding portion 55 are parallel with each other, and a short-side portion (portion extending in the front-back direction) of the inner protruding portion 53 and a short-side portion of the outer protruding portion 55 are parallel with each other.

A peripheral edge protruding portion 56 is provided at an upper end of the outer protruding portion 55. As shown in FIG. 1A, the peripheral edge protruding portion 56 protrudes upward from an upper surface of the outer protruding portion 55, and extends across the entire circumference of the outer protruding portion 55. Moreover, the peripheral edge protruding portion 56 is narrower than the outer protruding portion 55.

(Terminal/Combination Lock Member of Plug)

Figure 4:
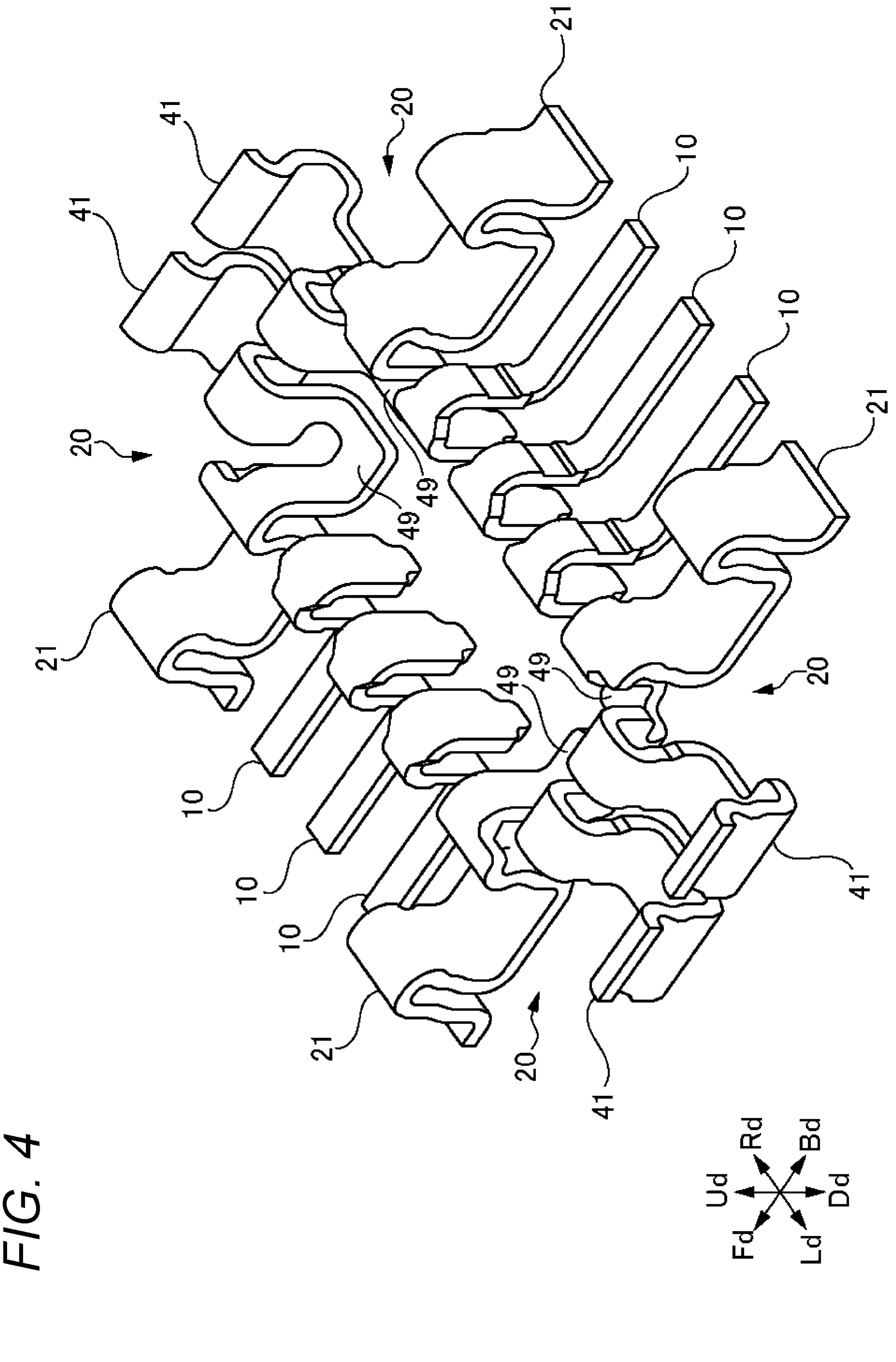
FIG. 4 is a perspective view showing terminals and combination lock members of the plug in the connector device of the embodiment of the present disclosure.

FIG. 4 shows a state in which the housing 50 is removed from the plug 2. As shown in FIG. 4, the six terminals 10 are arrayed in two rows and three columns at equal intervals at a middle portion of the plug 2 in the right-left direction. Moreover, the four combination lock members 20 are each arranged at a back left portion, a front left portion, a back right portion, and a front right portion of the plug 2. Specifically, one of the four combination lock members 20 is arranged at the left of the leftmost terminal 10 at a back portion of the plug 2. Another combination lock member 20 is arranged at the left of the leftmost terminal 10 at a front portion of the plug 2. Still another combination lock member 20 is arranged at the right of the rightmost terminal 10 at the back portion of the plug 2. The remaining combination lock member 20 is arranged at the right of the rightmost terminal 10 at the front portion of the plug 2.

Each terminal 10 and each combination lock member 20 are made of a material having conductivity, such as metal, e.g., copper alloy such as phosphor bronze. Each terminal 10 and each combination lock member 20 are formed in such a manner that a metal plate made of, e.g., copper alloy is cut into a predetermined shape and is bent, for example.

(Details of Terminal of Plug)

Figure 5:
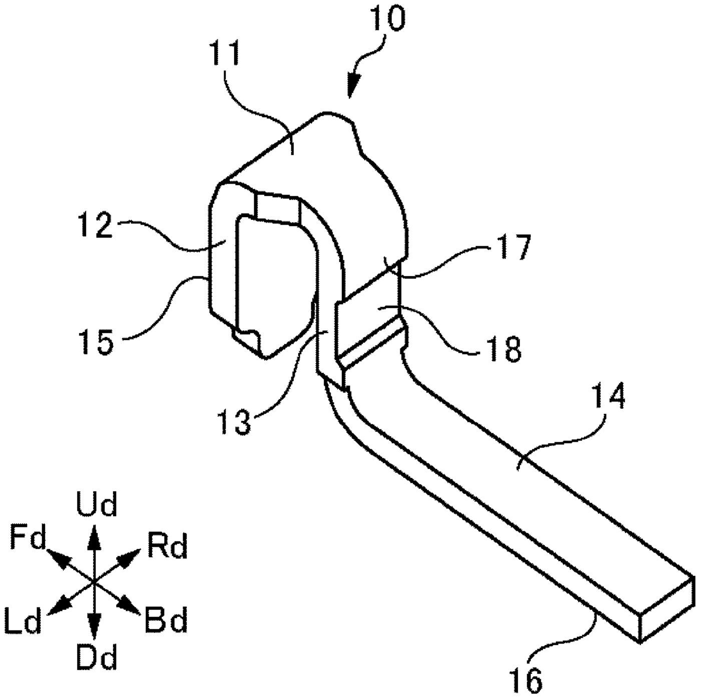
FIG. 5 is a perspective view showing the terminal of the plug in the connector device of the embodiment of the present disclosure.
Figure 6:
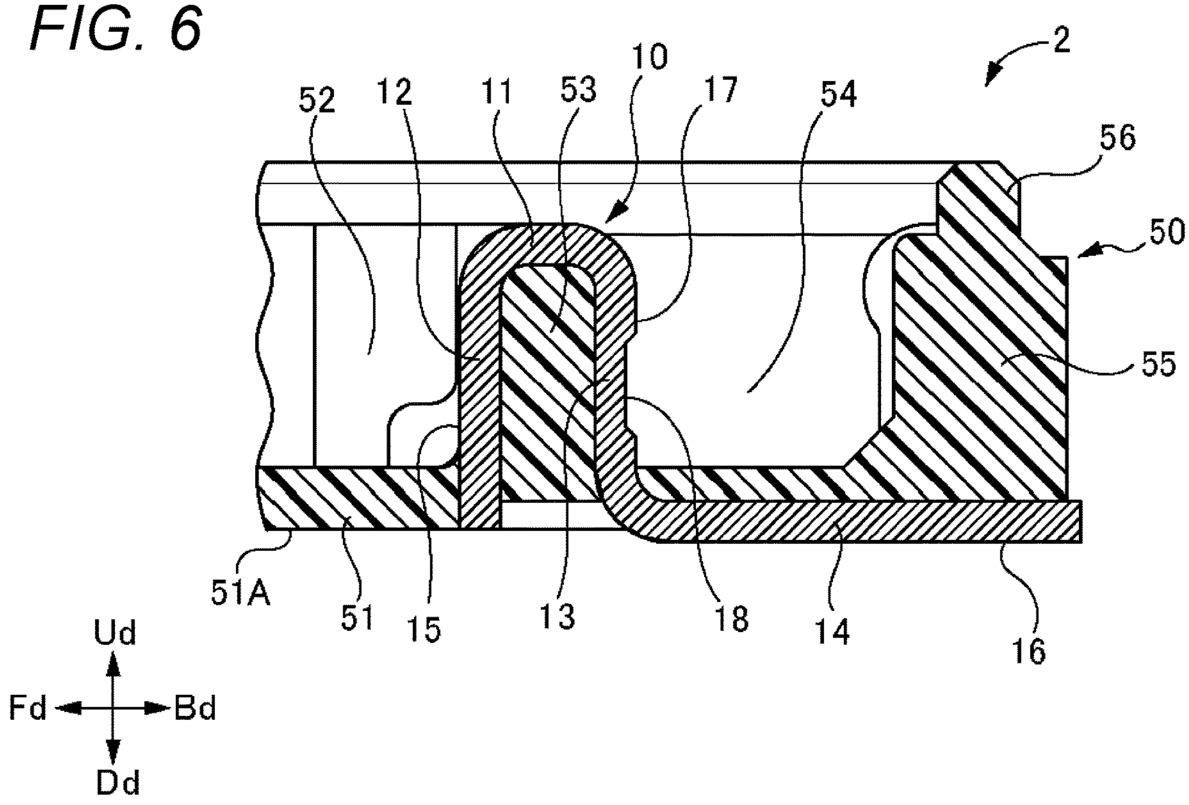
FIG. 6 is a sectional view showing a state in which the section of a back portion of the plug cut along a cut line VI-VI in FIG. 3 is viewed from the left.

FIG. 5 shows a state where one, which is arranged leftmost (leftmost terminal 10 in the back row), of the three terminals 10 arrayed at the back portion of the plug 2 in FIG. 4 is viewed from the upper left back side. FIG. 6 shows a state in which the section of the back portion of the plug 2 cut along a cut line VI-VI in FIG. 3 is viewed from the left. FIG. 6 shows the section of the leftmost terminal 10 of the back row.

As shown in FIGS. 5 and 6, the leftmost terminal 10 of the back row of the plug 2 has: an inner extending portion 11 extending from the outside to the inside (front) on an upper surface of the inner protruding portion 53 of the housing 50; an inner downwardly-extending portion 12 extending downward from an inner end portion (front end portion) of the inner extending portion 11 on an inner surface (front surface) of the inner protruding portion 53; an outer downwardly-extending portion 13 extending downward from an outer end portion (back end portion) of the inner extending portion 11 on an outer surface (back surface) of the inner protruding portion 53; and a lower extending portion 14 extending outward (backward) to an outer surface (back surface) of the bottom plate portion 51 on the lower surface 51A of the bottom plate portion 51 after having extended from a lower end portion of the outer downwardly-extending portion 13 through the bottom plate portion 51 to the lower surface 51A of the bottom plate portion 51.

Moreover, the leftmost terminal 10 of the back row has a contact portion 15, a connection portion 16, and a lock portion 17. The contact portion 15 contacts a contact portion 67 of a terminal 60 of the receptacle 3 when the plug 2 and the receptacle 3 are connected to each other. The contact portion 15 is provided at one end portion of the terminal 10, and is arranged on the inner surface of the inner protruding portion 53 of the housing 50. Specifically, the inner downwardly-extending portion 12 of the terminal 10 is the contact portion 15.

The connection portion 16 is connected to a circuit 122 provided on the mount surface 121A of the board 121. The connection portion 16 is provided at the other end portion of the terminal 10, and is arranged on the lower surface 51A of the bottom plate portion 51 of the housing 50. Specifically, the lower extending portion 14 is the connection portion 16.

The lock portion 17 is locked to a lock portion 69 of the terminal 60 of the receptacle 3 when the plug 2 and the receptacle 3 are connected to each other. The lock portion 17 is formed at an upper portion of the outer downwardly-extending portion 13 of the terminal 10. That is, a recess 18 is formed at a surface (back surface) of a lower portion of the outer downwardly-extending portion 13 facing the outer space 54, and as a result, a surface of the upper portion of the outer downwardly-extending portion 13 facing the outer space 54 projects toward the outer space 54 (backward) with respect to a bottom surface of the recess 18. Such a projecting portion is the lock portion 17.

Of the six terminals 10 of the plug 2, each terminal 10 other than the leftmost terminal 10 of the back row is also formed similarly to the leftmost terminal 10 of the back row. Each terminal 10 is joined to the housing 50 by insert molding, and is firmly held on the housing 50.

(Details of Combination Lock Member of Plug)

The four combination lock members 20 included in the plug 2 have a function of locking the plug 2 and the receptacle 3 to each other in cooperation with two combination lock members 70 included in the receptacle 3. That is, the combination lock members 20 of the plug 2 and the combination lock members 70 of the receptacle 3 have a function of retaining the plug 2 and the receptacle 3 after the plug 2 and the receptacle 3 have been connected to each other to hold a state of the plug 2 and the receptacle 3 being connected to each other. As shown in FIG. 3 or 4, each combination lock member 20 of the plug 2 is configured such that a front-back lock member 21 and a right-left lock member 41 are coupled to each other via a coupling portion 49. The combination lock member 20 configured such that the front-back lock member 21 and the right-left lock member 41 are integrally coupled to each other is formed in such a manner that a single metal plate cut into a predetermined shape is bent.

Since the plug 2 is provided with the four combination lock members 20, four front-back lock members 21 and four right-left lock members 41 are provided. Two of the four front-back lock members 21 are provided at positions at the back (one side) of the inner space 52 in the outer space 54 of the housing 50, and the remaining two front-back lock members 21 are provided at positions at the front (other side) of the inner space 52 in the outer space 54.

Two of the four right-left lock members 41 are provided at positions at the left (one side) of the inner space 52 in the outer space 54, and the remaining two right-left lock members 41 are provided at positions at the right (other side) of the inner space 52 in the outer space 54.

Each front-back lock member 21 is provided in a portion extending in the right-left direction in the outer space 54, and each right-left lock member 41 is provided in a portion extending in the front-back direction in the outer space 54.

Figure 7:
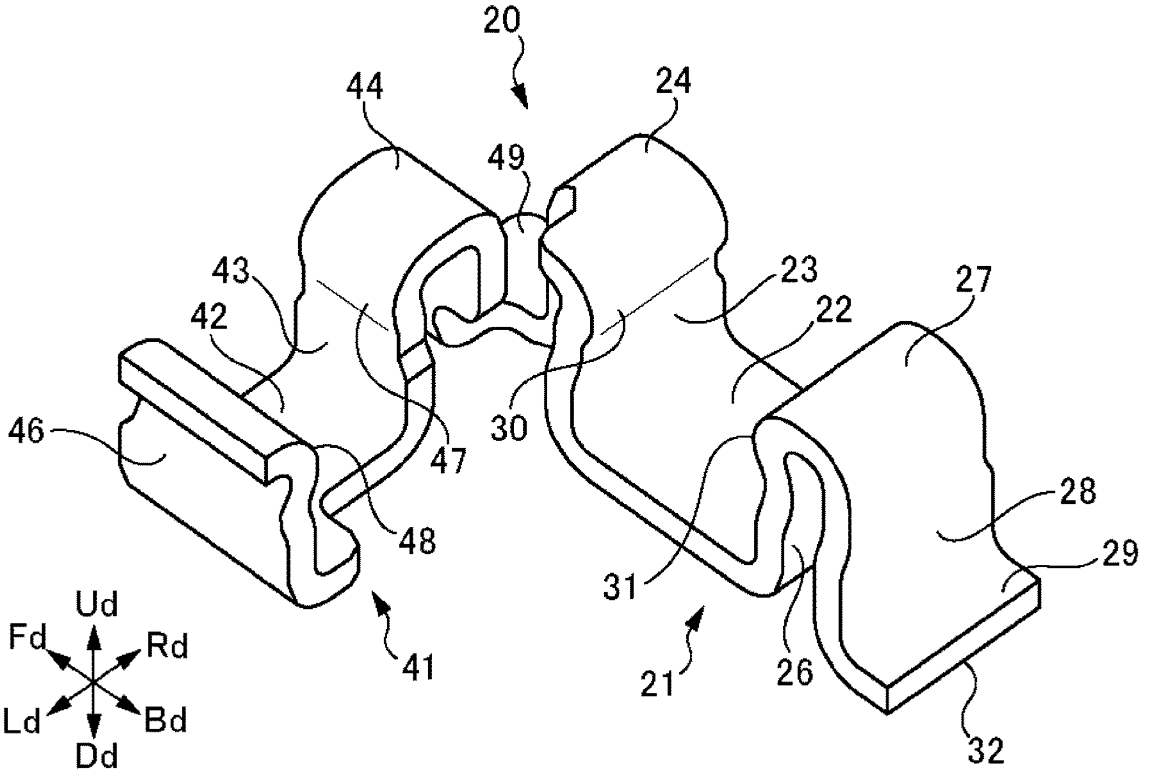
FIG. 7 is a perspective view showing the combination lock member of the plug in the connector device of the embodiment of the present disclosure.
Figure 8:
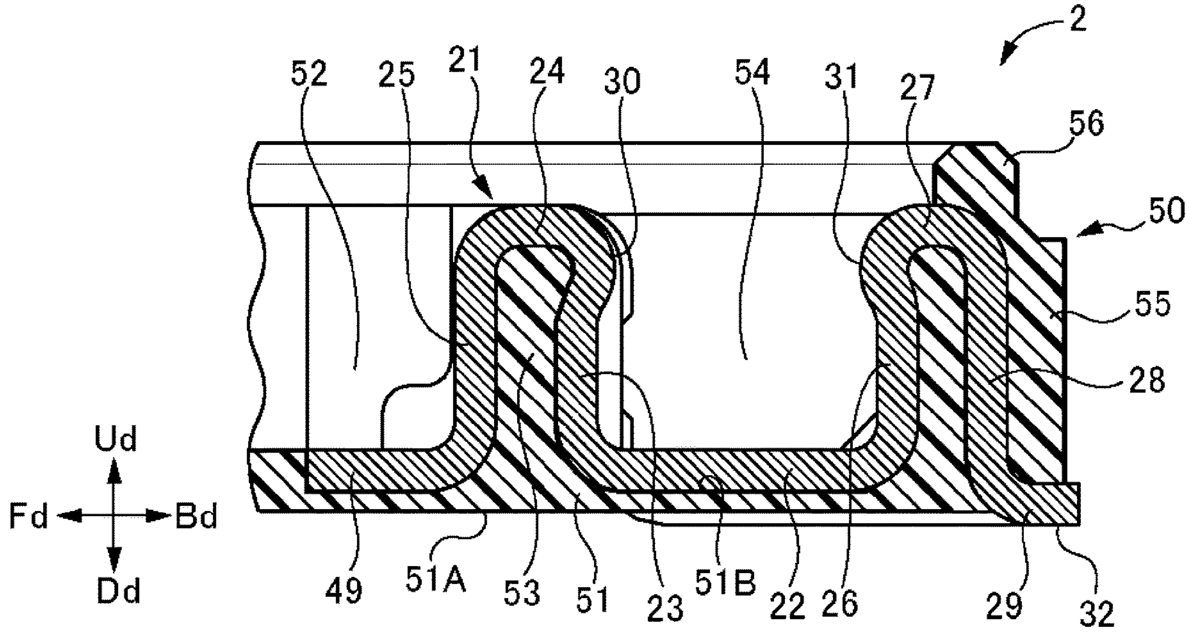
FIG. 8 is a sectional view showing a state in which the section of the back portion of the plug cut along a cut line VIII-VIII in FIG. 3 is viewed from the left.
Figure 9:
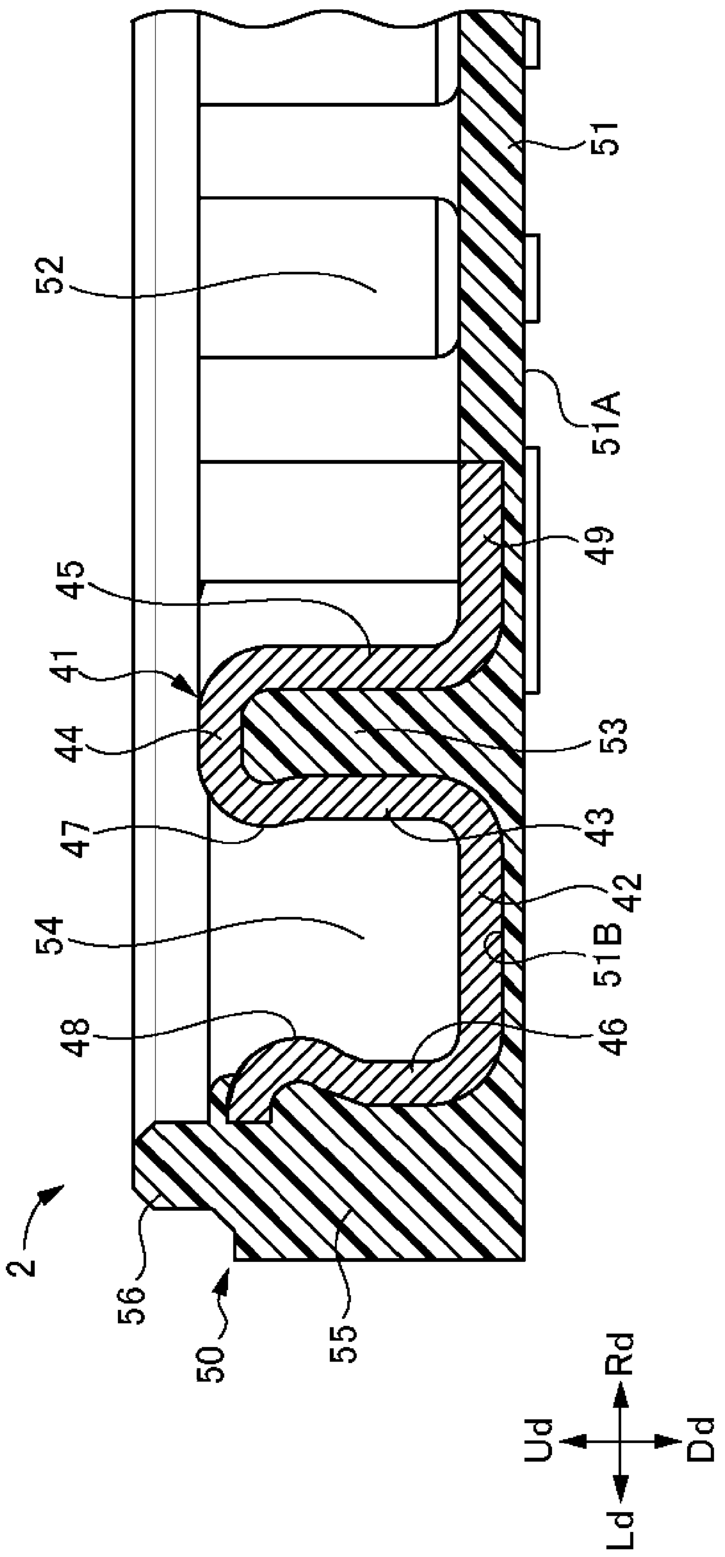
FIG. 9 is a sectional view showing a state in which the section of a left portion of the plug cut along a cut line IX-IX in FIG. 3 is viewed from the back.

FIG. 7 shows a state in which one combination lock member 20 arranged at the back left portion of the plug 2 in FIG. 4 is viewed from the upper left back side. FIG. 8 shows a state in which the section of the back portion of the plug 2 cut along a cut line VIII-VIII in FIG. 3 is viewed from the left. FIG. 8 shows the section of the front-back lock member 21 of the back left combination lock member 20. FIG. 9 shows a state in which the section of a left portion of the plug 2 cut along a cut line IX-IX in FIG. 3 is viewed from the back. FIG. 9 shows the section of the right-left lock member 41 of the back left combination lock member 20.

As shown in FIG. 8, in the back left combination lock member 20, the front-back lock member 21 has an outer extending portion 22 extending, between an inner surface (front surface) of the outer protruding portion 55 of the housing 50 and the outer surface (back surface) of the inner protruding portion 53 of the housing 50, from the outside to the inside (front) on an upper surface 51B of the bottom plate portion 51, an inner upwardly-extending portion 23 extending upward from an inner end portion (front end portion) of the outer extending portion 22 on the outer surface of the inner protruding portion 53, an inner extending portion 24 extending from the outside to the inside (front) from an upper end portion of the inner upwardly-extending portion 23 on the upper surface of the inner protruding portion 53, an inner downwardly-extending portion 25 extending downward from an inner end portion of the inner extending portion 24 on the inner surface of the inner protruding portion 53, and an outer upwardly-extending portion 26 extending upward from an outer end portion (back end portion) of the outer extending portion 22 on the inner surface of the outer protruding portion 55. Further, the front-back lock member 21 has: an outermost extending portion 27 extending from an upper end portion of the outer upwardly-extending portion 26, from the inside to the outside (back) in the outer protruding portion 55; an outer downwardly-extending portion 28 extending downward from an outer end portion of the outermost extending portion 27 to the lower surface 51A of the bottom plate portion 51 in the outer protruding portion 55; and a lower extending portion 29 extending outward (backward) from a lower end portion of the outer downwardly-extending portion 28 to the outer surface (back surface) of the bottom plate portion 51 on the lower surface 51A of the bottom plate portion 51. A lower end portion of the inner downwardly-extending portion 25 of the front-back lock member 21 is joined to the coupling portion 49 coupling the front-back lock member 21 and the right-left lock member 41 to each other. The entirety of the outer downwardly-extending portion 28 is embedded in the outer protruding portion 55.

In the back left combination lock member 20, the front-back lock member 21 has an inner lock portion 30 and an outer lock portion 31. The inner lock portion 30 is locked to an inner lock portion 76 of a front-back lock member 71 of the receptacle 3 when the plug 2 and the receptacle 3 are connected to each other. The inner lock portion 30 is provided at an upper portion of the inner upwardly-extending portion 23, and is arranged on the outer surface (back surface) of the inner protruding portion 53 of the housing 50. The inner lock portion 30 is formed such that the upper portion of the inner upwardly-extending portion 23 protrudes outward (backward).

When the plug 2 and the receptacle 3 are connected to each other, the outer lock portion 31 is locked to an outer lock portion 77 of the front-back lock member 71 of the receptacle 3. The outer lock portion 31 is provided at an upper portion of the outer upwardly-extending portion 26, and is arranged on the inner surface (front surface) of the outer protruding portion 55 of the housing 50. The outer lock portion 31 is formed such that the upper portion of the outer upwardly-extending portion 26 protrudes inward (forward). The outer lock portion 31 faces the inner lock portion 30 via the outer space 54 in the front-back direction.

In the back left combination lock member 20, the front-back lock member 21 has a connection portion 32. The connection portion 32 is connected to the mount surface 121A of the board 121. The plug 2 can be firmly fixed onto the mount surface 121A of the board 121 in such a manner that the connection portion 32 is connected (e.g., soldered) to a pad provided on the mount surface 121A of the board 121. The connection portion 32 may be connected to the circuit 122 provided on the mount surface 121A of the board 121. Thus, the back left combination lock member 20 can be utilized as a terminal. For example, the terminal 10 may serve as a signal terminal, and the combination lock member 20 may serve as a power terminal or a ground terminal. The connection portion 32 is provided at an outer end portion (back end portion) of the front-back lock member 21, and is arranged on the lower surface 51A of the bottom plate portion 51 of the housing 50. Specifically, the lower extending portion 29 of the front-back lock member 21 is the connection portion 32.

In the back left combination lock member 20, the right-left lock member 41 has, as shown in FIG. 9, an outer extending portion 42 extending, between the inner surface (right surface) of the outer protruding portion 55 of the housing 50 and the outer surface (left surface) of the inner protruding portion 53 of the housing 50, from the outside to the inside (right) on the upper surface 51B of the bottom plate portion 51, an inner upwardly-extending portion 43 extending upward from an inner end portion (right end portion) of the outer extending portion 42 on the outer surface of the inner protruding portion 53, an inner extending portion 44 extending from the outside to the inside (right) from an upper end portion of the inner upwardly-extending portion 43 on the upper surface of the inner protruding portion 53, an inner downwardly-extending portion 45 extending downward from an inner end portion of the inner extending portion 44 on the inner surface of the inner protruding portion 53, and an outer upwardly-extending portion 46 extending upward from an outer end portion (left end portion) of the outer extending portion 42 on the inner surface of the outer protruding portion 55. A lower end portion of the inner downwardly-extending portion 45 of the right-left lock member 41 is joined to the coupling portion 49.

In the back left combination lock member 20, the right-left lock member 41 has an inner lock portion 47 and an outer lock portion 48. The inner lock portion 47 is locked to an inner lock portion 85 of a right-left lock member 81 of the receptacle 3 when the plug 2 and the receptacle 3 are connected to each other. The inner lock portion 47 is provided at an upper portion of the inner upwardly-extending portion 43, and is arranged on the outer surface (left surface) of the inner protruding portion 53 of the housing 50. The inner lock portion 47 is formed such that the upper portion of the inner upwardly-extending portion 43 protrudes outward (leftward).

The outer lock portion 48 is locked to an outer lock portion 86 of the front-back lock member 71 of the receptacle 3 when the plug 2 and the receptacle 3 are connected to each other. The outer lock portion 48 is provided at an upper portion of the outer upwardly-extending portion 46, and is arranged on the inner surface (right surface) of the outer protruding portion 55 of the housing 50. The outer lock portion 48 is formed such that the upper portion of the outer upwardly-extending portion 46 protrudes inward (rightward). The outer lock portion 48 faces the inner lock portion 47 via the outer space 54 in the right-left direction.

As shown in FIG. 4, the combination lock member 20 arranged at the front left portion of the plug 2 is formed symmetrical to the back left combination lock member 20 in the front-back direction. Moreover, the combination lock member 20 arranged at the back right portion of the plug 2 is the same combination lock member as the front left combination lock member 20, the combination lock member 20 being arranged at the back right portion of the plug 2 after having rotated 180 degrees from the orientation at the front left portion in the horizontal plane. The combination lock member 20 arranged at the front right portion of the plug 2 is the same combination lock member as the back left combination lock member the combination lock member 20 being arranged at the front right portion of the plug 2 after having rotated 180 degrees from the orientation at the back left portion in the horizontal plane. Each combination lock member 20 is joined to the housing 50 by insert molding, and is firmly held on the housing 50.

Note that each of the front-back lock member 21 and the right-left lock member 41 is a specific example of a "first lock member." Moreover, the outer extending portion 22, 42 is a specific example of a "first outer extending portion," the inner upwardly-extending portion 23, 43 is a specific example of a "first inner upwardly-extending portion," and the outer upwardly-extending portion 26, 46 is a specific example of a "first outer upwardly-extending portion." Further, the outermost extending portion 27 is a specific example of a "first outermost extending portion," the outer downwardly-extending portion 28 is a specific example of a "first outer downwardly-extending portion," and the lower extending portion 29 is a specific example of a "first lower extending portion." In addition, the inner lock portion 30, 47 is a specific example of a "first inner lock portion," and the outer lock portion 31, 48 is a specific example of a "first outer lock portion."

(Receptacle)

Figure 10:
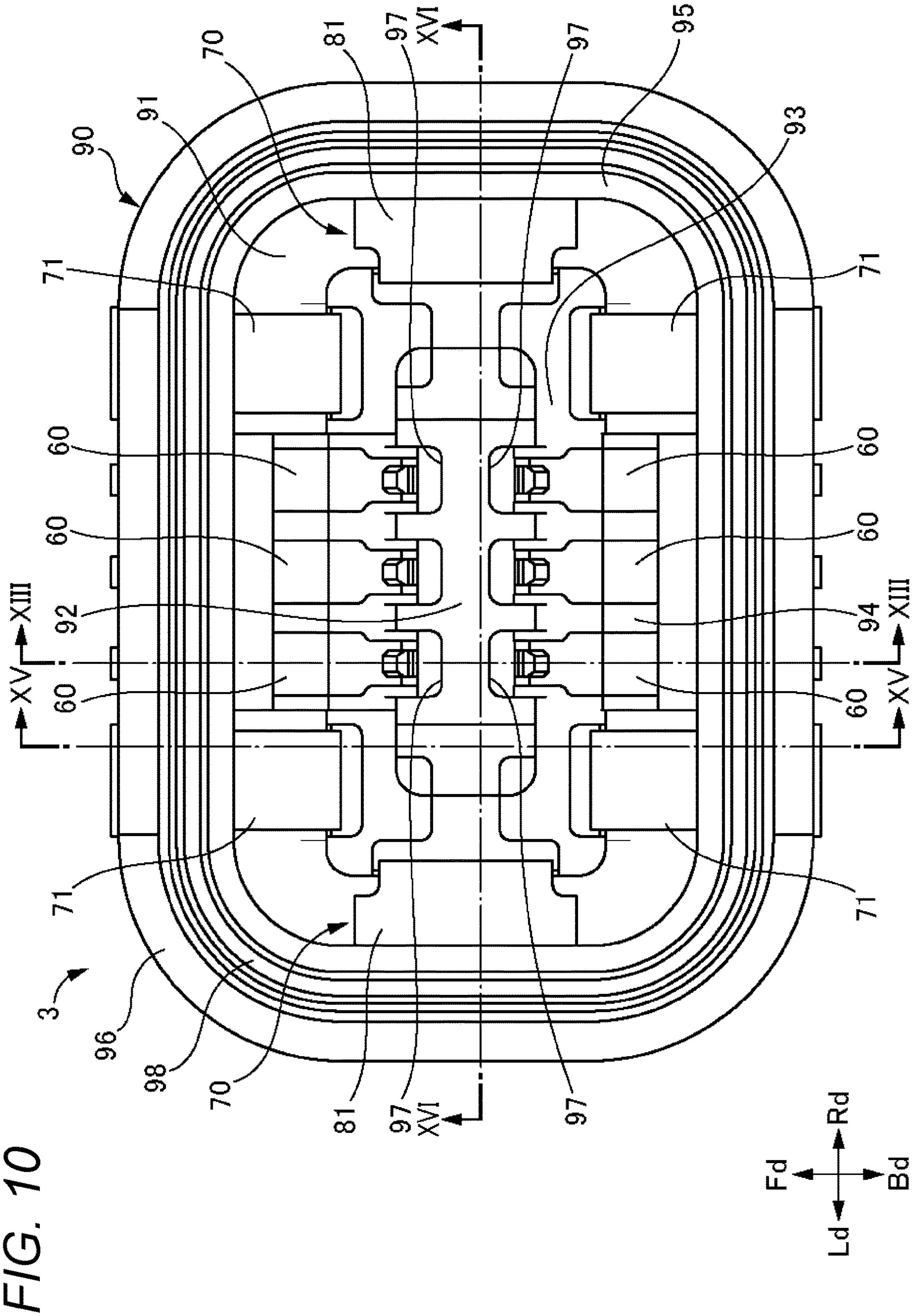
FIG. 10 is an external view showing, from above, the state of the receptacle in the connector device of the embodiment of the present disclosure.

FIG. 10 shows the state of the receptacle 3 from above. As shown in FIG. 10, the receptacle 3 includes six terminals 60, two combination lock members 70, and a housing 90 holding the terminals 60 and the combination lock members 70. As in the plug 2, the receptacle 3 is formed by insert molding. Note that each terminal 60 is a specific example of a "second terminal," each combination lock member 70 is a specific example of a "second combination lock member," and the housing 90 is a specific example of a "second housing."

(Housing of Receptacle)

As shown in FIG. 1B, the housing 90 of the receptacle 3 is formed in a substantially rectangular parallelepiped shape from a material having insulating properties, such as resin, e.g., liquid crystal polymer. The housing 90 has a bottom plate portion 91, an inner protruding portion 92, an inner space 93, an outer protruding portion 94, an outer space 95, and a peripheral wall portion 96. Note that the bottom plate portion 91 is a specific example of a "second plate portion," the inner protruding portion 92 is a specific example of a "second inner protruding portion," and the inner space 93 is a specific example of a "second inner space." Moreover, the outer protruding portion 94 is a specific example of a "second outer protruding portion," and the outer space 95 is a specific example of a "second outer space."

The bottom plate portion 91 is a plate-shaped portion forming the bottom of the housing 90. When the receptacle 3 is mounted on the board 131, the receptacle 3 is placed on the mount surface 131A such that a lower surface 91A of the bottom plate portion 91 faces the mount surface 131A of the board 131 (see FIG. 2). The inner protruding portion 92 is arranged at the center in the front-back direction and the right-left direction on the bottom plate portion 91, and protrudes upward from the bottom plate portion 91. The inner space 93 is provided outside the inner protruding portion 92 on the bottom plate portion 91, and surrounds the outside of the inner protruding portion 92 across the entire circumference thereof. The outer protruding portion 94 protrudes upward from the bottom plate portion 91, and surrounds the outside of the inner space 93 across the entire circumference thereof. That is, the inner space 93 is a space provided between the inner protruding portion 92 and the outer protruding portion 94. The outer space 95 is provided outside the outer protruding portion 94 on the bottom plate portion 91, and surrounds the outside of the outer protruding portion 94 across the entire circumference thereof. The peripheral wall portion 96 protrudes upward from a peripheral edge portion of the bottom plate portion 91, and surrounds the outside of the outer space 95 across the entire circumference thereof.

As shown in FIG. 10, as viewed from above the housing 90, the shape of the inner protruding portion 92 is a rectangular shape longer in the right-left direction than in the front-back direction. Each of the outer protruding portion 94 and the peripheral wall portion 96 is formed in the shape of a rectangular ring having a rectangular outer shape elongated in the right-left direction than in the front-back direction. The center of the inner protruding portion 92, the center of the outer protruding portion 94, and the center of the peripheral wall portion 96 are coincident with each other. A long-side portion (portion extending in the right-left direction) of the inner protruding portion 92, a long-side portion of the outer protruding portion 94, and a long-side portion of the peripheral wall portion 96 are parallel with each other. A short-side portion (portion extending in the front-back direction) of the inner protruding portion 92, a short-side portion of the outer protruding portion 94, and a short-side portion of the peripheral wall portion 96 are parallel with each other.

Multiple terminal arrangement recessed portions 97 are formed at the inner protruding portion 92. Each terminal arrangement recessed portion 97 is a recessed portion for forming a space where the contact portion 67 of the terminal 60 is displaceable. Corresponding to the terminals 60 arrayed in two rows and three columns, three terminal arrangement recessed portions 97 are formed at a back surface of the inner protruding portion 92, and three other terminal arrangement recessed portions 97 are formed at a front surface of the inner protruding portion 92.

A peripheral edge groove 98 is provided at a portion between the outer protruding portion 94 and the peripheral wall portion 96 at an upper surface of the bottom plate portion 91. The peripheral edge groove 98 extends across the entire circumference thereof between the outer protruding portion 94 and the peripheral wall portion 96. Moreover, the peripheral edge groove 98 has a smaller width than a clearance between the outer protruding portion 94 and the peripheral wall portion 96.

(Terminal/Combination Lock Member of Receptacle)

Figure 11:
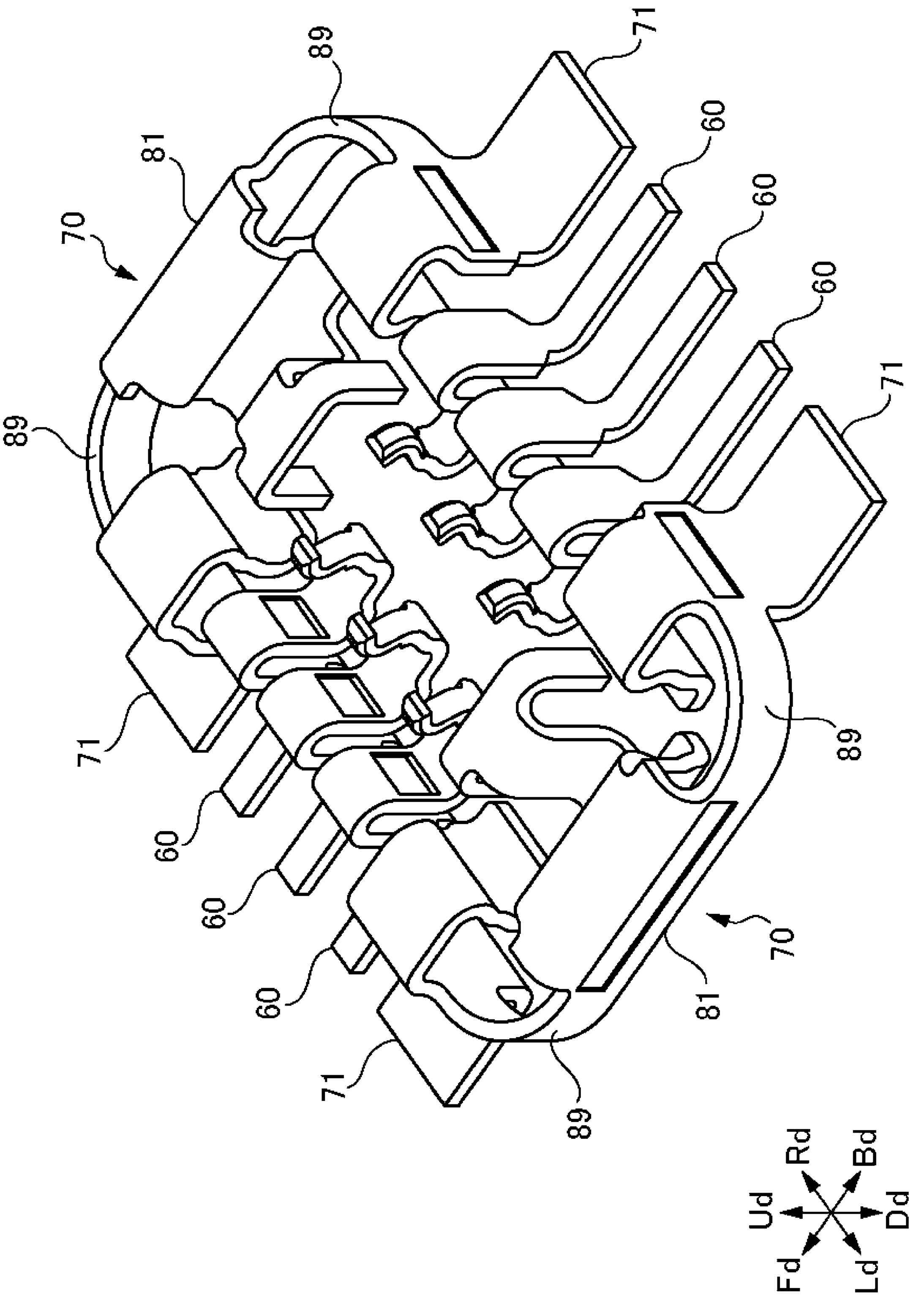
FIG. 11 is a perspective view showing terminals and combination lock members of the receptacle in the connector device of the embodiment of the present disclosure.

FIG. 11 shows a state in which the housing 90 is removed from the receptacle 3. As shown in FIG. 11, the six terminals 60 are arrayed in two rows and three columns at equal intervals at a middle portion of the receptacle 3 in the right-left direction. The six terminals 60 are arranged corresponding to the six terminals 10 of the plug 2 in one-to-one correspondence. The two combination lock members 70 are each arranged at a left portion and a right portion of the receptacle 3. Specifically, one combination lock member 70 is arranged at the left of the two leftmost terminals 60 at a back portion and a front portion of the receptacle 3. The other combination lock member 70 is arranged at the right of the two rightmost terminals 60 at the back and front portions of the receptacle 3.

Each terminal 60 and each combination lock member 70 are made of a material having conductivity, such as metal, e.g., copper alloy such as phosphor bronze. Each terminal 60 and each combination lock member 70 are formed in such a manner that a metal plate made of, e.g., copper alloy is cut into a predetermined shape and is bent, for example.

(Details of Terminal of Receptacle)

Figure 12:
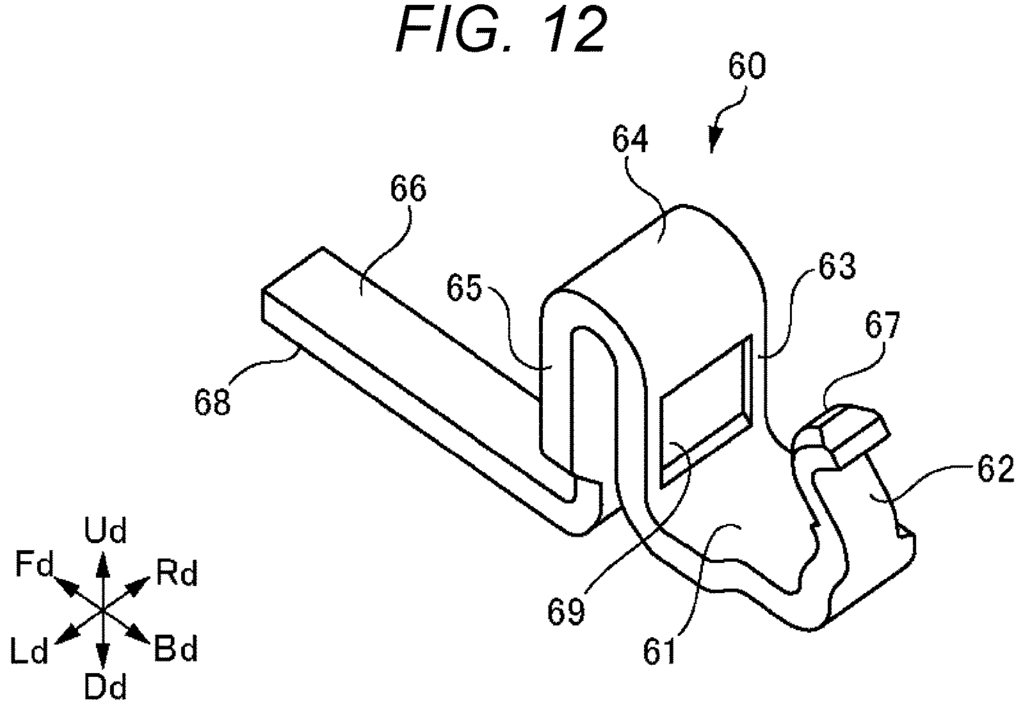
FIG. 12 is a perspective view showing the terminal of the receptacle in the connector device of the embodiment of the present disclosure.
Figure 13:
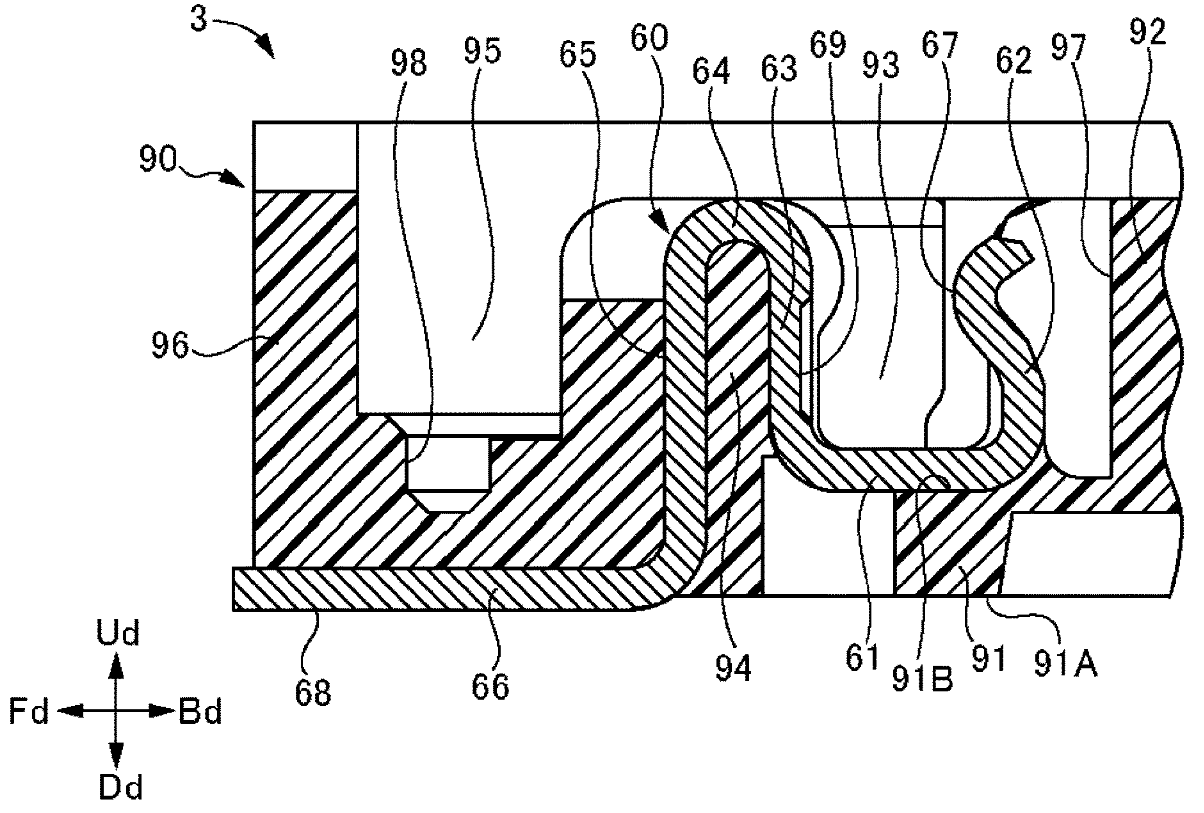
FIG. 13 is a sectional view showing a state in which the section of a front portion of the receptacle cut along a cut line XIII-XIII in FIG. 10 is viewed from the left.

FIG. 12 shows a state where one, which is arranged leftmost (leftmost terminal 60 of the front row), of the three terminals 60 arrayed at the front portion of the receptacle 3 in FIG. 11 is viewed from the upper left back side. FIG. 13 shows a state in which the section of the front portion of the receptacle 3 cut along a cut line XIII-XIII in FIG. 10 is viewed from the left. FIG. 13 shows the section of the leftmost terminal 60 of the front row.

As shown in FIGS. 12 and 13, the leftmost terminal 60 of the front row of the receptacle 3 has an inner extending portion 61 extending, between an inner surface (back surface) of the outer protruding portion 94 of the housing 90 and an outer surface (front surface) of the inner protruding portion 92 of the housing 90, from the outside to the inside (back) on an upper surface 91B of the bottom plate portion 91, an inner upwardly-extending portion 62 extending upward from an inner end portion (back end portion) of the inner extending portion 61, an outer upwardly-extending portion 63 extending upward from an outer end portion (front end portion) of the inner extending portion 61 on the inner surface of the outer protruding portion 94, an outer extending portion 64 extending from the inside to the outside (front) from an upper end portion of the outer upwardly-extending portion 63 on an upper surface of the outer protruding portion 94, an outer downwardly-extending portion 65 extending downward from an outer end portion of the outer extending portion 64 to the lower surface 91A of the bottom plate portion 91 in the outer protruding portion 94, and a lower extending portion 66 extending outward (forward) from a lower end portion of the outer downwardly-extending portion 65 to an outer surface (front surface) of the bottom plate portion 91 on the lower surface 91A of the bottom plate portion 91.

The leftmost terminal 60 of the front row has the contact portion 67, a connection portion 68, and the lock portion 69. The contact portion 67 contacts the contact portion 15 of the terminal 10 of the plug 2 when the plug 2 and the receptacle 3 are connected to each other. The contact portion 67 is provided at one end portion of the terminal 60, specifically an upper portion of the inner upwardly-extending portion 62. The contact portion 67 is formed such that part of the upper portion of the inner upwardly-extending portion 62 protrudes outward (forward). As shown in FIG. 13, the contact portion 67 is arranged near an opening of the terminal arrangement recessed portion 97 formed in the inner protruding portion 92. When the plug 2 and the receptacle 3 are connected to each other, the contact portion 67 is pushed by the contact portion 15 of the terminal 10 of the plug 2 and is displaced inward (backward), and accordingly, strongly contacts the contact portion 15 of the terminal by elastic force of the inner upwardly-extending portion 62.

The connection portion 68 is connected to a circuit 132 provided on the mount surface 131A of the board 131. The connection portion 68 is provided at the other end portion of the terminal 60, and is arranged on the lower surface 91A of the bottom plate portion 91 of the housing 90. Specifically, the lower extending portion 66 is the connection portion 68.

The lock portion 69 is locked to the lock portion 17 of the terminal 10 of the plug 2 when the plug 2 and the receptacle 3 are connected to each other. The lock portion 69 is formed at a lower portion of the outer upwardly-extending portion 63 of the terminal 60. That is, a recess is formed in the surface (back surface) of the lower portion of the outer upwardly-extending portion 63 facing the inner space 93, and is the lock portion 69.

Of the six terminals 60 of the receptacle 3, each terminal 60 other than the leftmost terminal 60 of the front row is formed similarly to the leftmost terminal 60 of the front row. Each terminal 60 is joined to the housing 90 by insert molding, and is firmly held on the housing 90.

(Details of Combination Lock Member of Receptacle)

The two combination lock members 70 included in the receptacle 3 have a function of locking the plug 2 and the receptacle 3 to each other in cooperation with the four combination lock members 20 included in the plug 2. As shown in FIG. 11, the combination lock member 70 arranged at the left portion of the receptacle 3 is configured such that the front-back lock member 71 arranged at a back left portion of the receptacle 3 and the right-left lock member 81 arranged at the left portion of the receptacle 3 are coupled to each other via a coupling portion 89 positioned at a back left corner portion of the receptacle 3 and the front-back lock member 71 arranged at a front left portion of the receptacle 3 and the right-left lock member 81 arranged at the left portion of the receptacle 3 are coupled to each other via a coupling portion 89 positioned at a front left corner portion of the receptacle 3. The combination lock member 70 arranged at the right portion of the receptacle 3 is configured such that the front-back lock member 71 arranged at a back right portion of the receptacle 3 and the right-left lock member 81 arranged at the right portion of the receptacle 3 are coupled to each other via a coupling portion 89 positioned at a back right corner portion of the receptacle 3 and the front-back lock member 71 arranged at a front right portion of the receptacle 3 and the right-left lock member 81 arranged at the right portion of the receptacle 3 are coupled to each other via a coupling portion 89 positioned at a front right corner portion of the receptacle 3. Each combination lock member 70 configured such that the two front-back lock members 71 and the one right-left lock member 81 are integrally coupled to each other as described above is formed in such a manner that a single metal plate cut into a predetermined shape is bent.

Since the receptacle 3 is provided with the two combination lock members 70, four front-back lock members 71 and two right-left lock members 81 are provided. Two of the four front-back lock members 71 are provided at positions at the back (one side) of the inner protruding portion 92 at the outer protruding portion 94 of the housing 90, and the remaining two front-back lock members 71 are provided at positions at the front (other side) of the inner protruding portion 92 at the outer protruding portion 94. One of the two right-left lock members 81 is provided at a position at the left (one side) of the inner protruding portion 92 at the outer protruding portion 94, and the other right-left lock member 81 is provided at a position at the right (other side) of the inner protruding portion 92 at the outer protruding portion 94. Each front-back lock member 71 is provided at a portion extending in the right-left direction at the outer protruding portion 94, and each right-left lock member 81 is provided at a portion extending in the front-back direction at the outer protruding portion 94.

Figure 14:
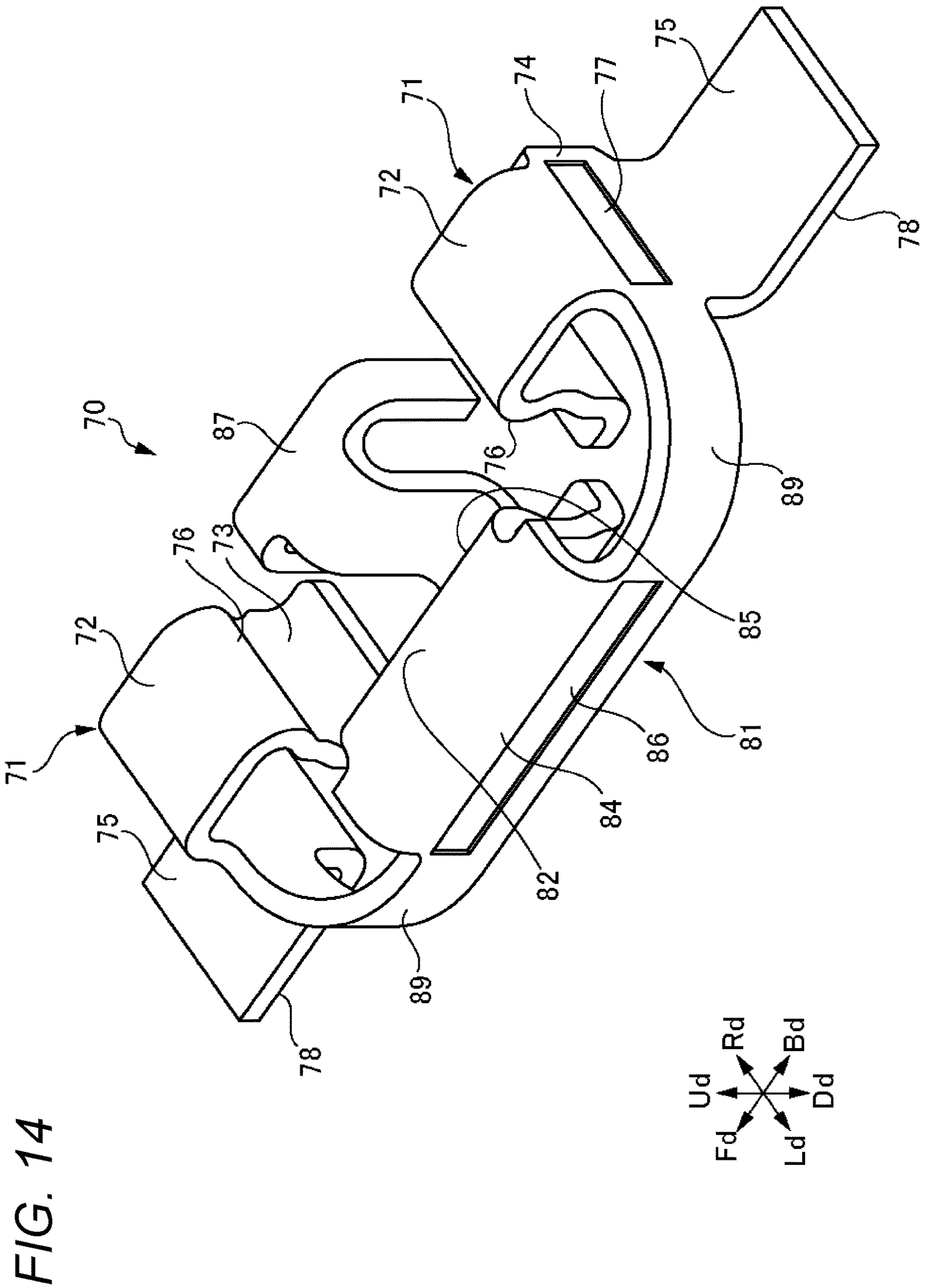
FIG. 14 is a perspective view showing the combination lock member of the receptacle in the connector device of the embodiment of the present disclosure.
Figure 15:
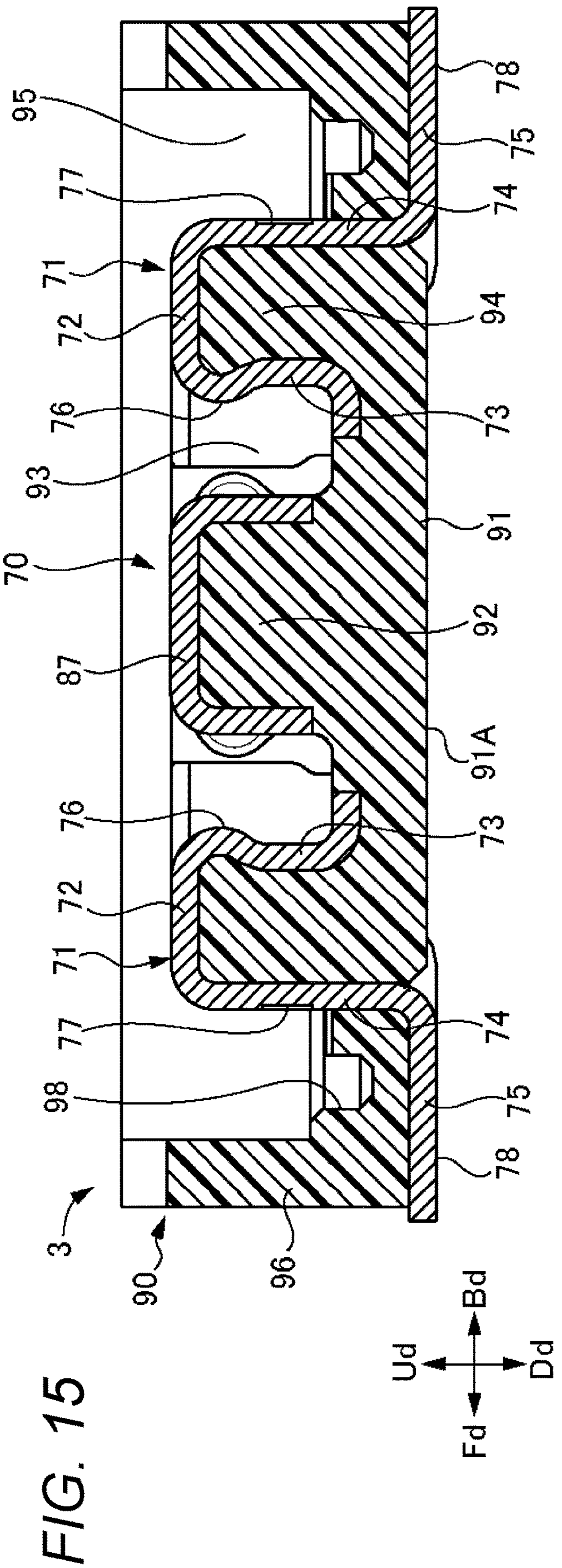
FIG. 15 is a sectional view showing a state in which the section of the receptacle cut along a cut line XV-XV in FIG. 10 is viewed from the left.
Figure 16:
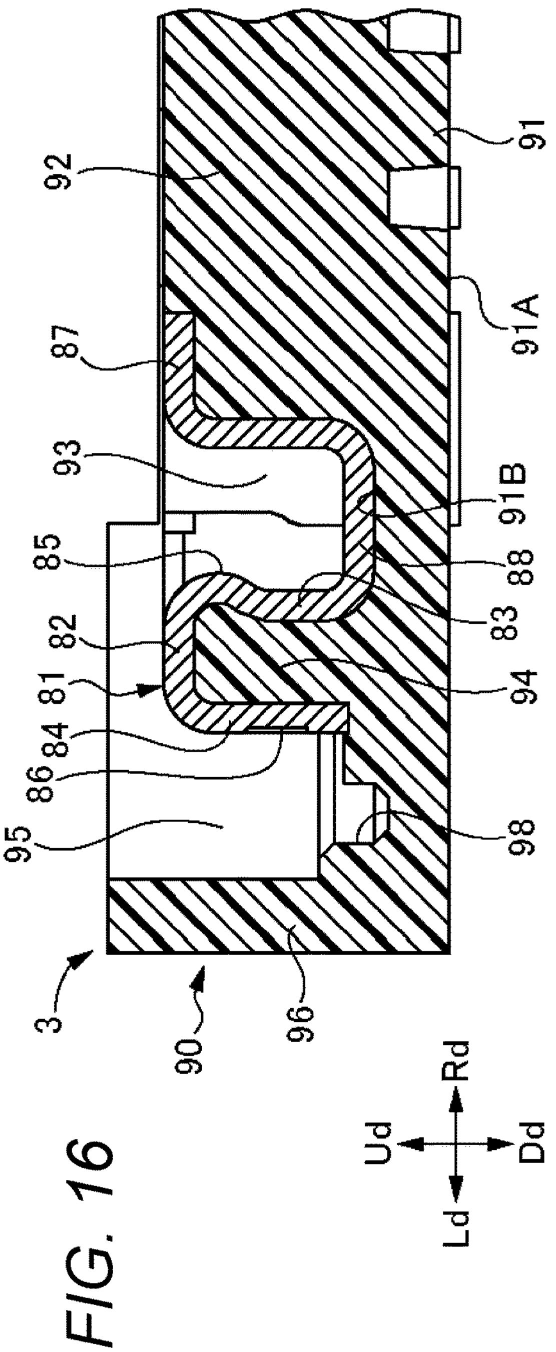
FIG. 16 is a sectional view showing a state in which the section of a left portion of the receptacle cut along a cut line XVI-XVI in FIG. 10 is viewed from the back.

FIG. 14 shows the state of the left combination lock members 70 from the upper left back side. FIG. 15 shows a state in which the section of the receptacle 3 cut along a cut line XV-XV in FIG. 10 is viewed from the left. FIG. 15 shows the section of the two front-back lock members 71 included in the left combination lock member 70. FIG. 16 shows a state in which the section of the left portion of the receptacle 3 cut along a cut line XVI-XVI in FIG. 10 is viewed from the back. FIG. 16 shows the section of the right-left lock member 81 in the left combination lock member 70.

In the left combination lock member 70 of the receptacle 3, the back left front-back lock member 71 has, as shown on the right side in FIG. 15, an outer extending portion 72 extending from the outside to the inside (front) on the upper surface of the outer protruding portion 94 of the housing 90, an inner downwardly-extending portion 73 extending downward from an inner end portion (front end portion) of the outer extending portion 72 on the inner surface (front surface) of the outer protruding portion 94, an outer downwardly-extending portion 74 extending downward from an outer end portion (back end portion) of the outer extending portion 72 on an outer surface (back surface) of the outer protruding portion 94, and a lower extending portion 75 extending outward (backward) to the outer surface (back surface) of the bottom plate portion 91 on the lower surface 91A of the bottom plate portion 91 after having extended from a lower end portion of the outer downwardly-extending portion 74 to the lower surface of the bottom plate portion 91 in the bottom plate portion 91.

In the left combination lock member 70, the back left front-back lock member 71 has the inner lock portion 76 and the outer lock portion 77. The inner lock portion 76 is locked to the inner lock portion 30 of the front-back lock member 21 of the plug 2 when the plug 2 and the receptacle 3 are connected to each other. The inner lock portion 76 is provided at an upper portion of the inner downwardly-extending portion 73, and is arranged on the inner surface (front surface) of the outer protruding portion 94 of the housing 90. The inner lock portion 76 is formed such that the upper portion of the inner downwardly-extending portion 73 protrudes inward (forward).

The outer lock portion 77 is locked to the outer lock portion 31 of the front-back lock member 21 of the plug 2 when the plug 2 and the receptacle 3 are connected to each other. The outer lock portion 77 is provided at a lower portion of the outer downwardly-extending portion 74, and is arranged on the outer surface (back surface) of the outer protruding portion 94 of the housing 90. That is, a recess is formed in the surface (back surface) of the lower portion of the outer downwardly-extending portion 74 facing the outer space 95, and is the outer lock portion 77. The outer lock portion 77 faces the inner lock portion 76 via the outer protruding portion 94 in the front-back direction.

In the left combination lock member 70, the back left front-back lock member 71 has a connection portion 78. As in the front-back lock member 21 of the plug 2, the receptacle 3 can be firmly fixed onto the mount surface 131A of the board 131 in such a manner that the connection portion 78 is connected (e.g., soldered) to the mount surface 131A of the board 131. The left combination lock member 70 can be utilized as a terminal in such a manner that the connection portion 78 is connected to the circuit 132 provided on the mount surface 131A of the board 131. The connection portion 78 is provided at an outer end portion (back end portion) of the back left front-back lock member 71, and is arranged on the lower surface 91A of the bottom plate portion 91 of the housing 90. Specifically, the lower extending portion 75 of the back left front-back lock member 71 is the connection portion 78.

In the left combination lock member 70, the front left front-back lock member 71 is formed symmetrical to the back left front-back lock member 71 of the left combination lock member 70 in the front-back direction, as shown in FIG. 14.

In the left combination lock member 70, the right-left lock member 81 has, as shown in FIG. 16, an outer extending portion 82 extending from the outside to the inside (right) on the upper surface of the outer protruding portion 94 of the housing 90, an inner downwardly-extending portion 83 extending downward from an inner end portion (right end portion) of the outer extending portion 82 on the inner surface (right surface) of the outer protruding portion 94, and an outer downwardly-extending portion 84 extending downward from an outer end portion (left end portion) of the outer extending portion 82 on the outer surface (left surface) of the outer protruding portion 94.

In the left combination lock member 70, the right-left lock member 81 has the inner lock portion 85 and the outer lock portion 86. The inner lock portion 85 is locked to the inner lock portions 47 of the two right-left lock members 41 of the plug 2 facing the right-left lock member 81 of the left combination lock member 70 in the up-down direction when the plug 2 and the receptacle 3 are connected to each other. The inner lock portion 85 is provided at an upper portion of the inner downwardly-extending portion 83, and is arranged on the inner surface (right surface) of the outer protruding portion 94 of the housing 90. The inner lock portion 85 is formed such that the upper portion of the inner downwardly-extending portion 83 protrudes inward (rightward).

The outer lock portion 86 is locked to the outer lock portions 48 of the two right-left lock members 41 of the plug 2 facing the right-left lock member 81 of the left combination lock member 70 in the up-down direction when the plug 2 and the receptacle 3 are connected to each other. The outer lock portion 86 is provided at a lower portion of the outer downwardly-extending portion 84, and is arranged on the outer surface (left surface) of the outer protruding portion 94 of the housing 90. That is, a recess is formed in the surface (left surface) of the lower portion of the outer downwardly-extending portion 84 facing the outer space 95, and is the outer lock portion 86. The outer lock portion 86 faces the inner lock portion 85 via the outer protruding portion 94 in the right-left direction.

In the left combination lock member 70, the right-left lock member 81 has a cover portion 87 covering a left end portion of the inner protruding portion 92 of the housing 90. The cover portion 87 has a function of reinforcing the left end portion of the inner protruding portion 92. As shown in FIG. 16, the cover portion 87 is coupled to a lower end portion of the inner downwardly-extending portion 83 of the right-left lock member 81 via a cover coupling portion 88 extending from the inner surface (right surface) of the outer protruding portion 94 to the outer surface (left surface) of the inner protruding portion 92 on the upper surface 91B of the bottom plate portion 91.

As shown in FIG. 14, in the left combination lock member 70, the coupling portion 89 coupling the back left front-back lock member 71 and the right-left lock member 81 to each other couples a left end portion of the outer downwardly-extending portion 74 of the back left front-back lock member 71 and a back end portion of the outer downwardly-extending portion 74 of the right-left lock member 81 to each other. Moreover, such a coupling portion 89 extends on an outer surface of a back left corner portion of the outer protruding portion 94 of the housing 90. The outer surface of the back left corner portion of the outer protruding portion 94 is an arc-shaped round surface. The coupling portion 89 curves in an arc shape along the round surface. Similarly, in the left combination lock member 70, the coupling portion 89 coupling the front left front-back lock member 71 and the right-left lock member 81 to each other couples a left end portion of the outer downwardly-extending portion 74 of the front left front-back lock member 71 and a front end portion of the outer downwardly-extending portion 74 of the right-left lock member 81 to each other. Moreover, such a coupling portion 89 extends on an outer surface of a front left corner portion of the outer protruding portion 94 of the housing 90, and curves along a round surface of the outer surface of the front left corner portion of the outer protruding portion 94.

As shown in FIG. 11, the combination lock member 70 arranged at the right portion of the receptacle 3 is formed symmetrical to the left combination lock member 70 in the right-left direction. Moreover, each combination lock member 70 is joined to the housing 90 by insert molding, and is firmly held on the housing 90.

Note that each of the front-back lock member 71 and the right-left lock member 81 is a specific example of a "second lock member." Moreover, the outer extending portion 72, 82 is a specific example of a "second outer extending portion," the inner downwardly-extending portion 73, 83 is a specific example of a "second inner downwardly-extending portion, and the outer downwardly-extending portion 74, 84 is a specific example of a "second outer downwardly-extending portion." Further, the lower extending portion 75 is a specific example of a "second lower extending portion." In addition, the inner lock portion 76, 85 is a specific example of a "second inner lock portion," and the outer lock portion 77, 86 is a specific example of a "second outer lock portion."

(Connection Between Plug and Receptacle)

Figure 17A:
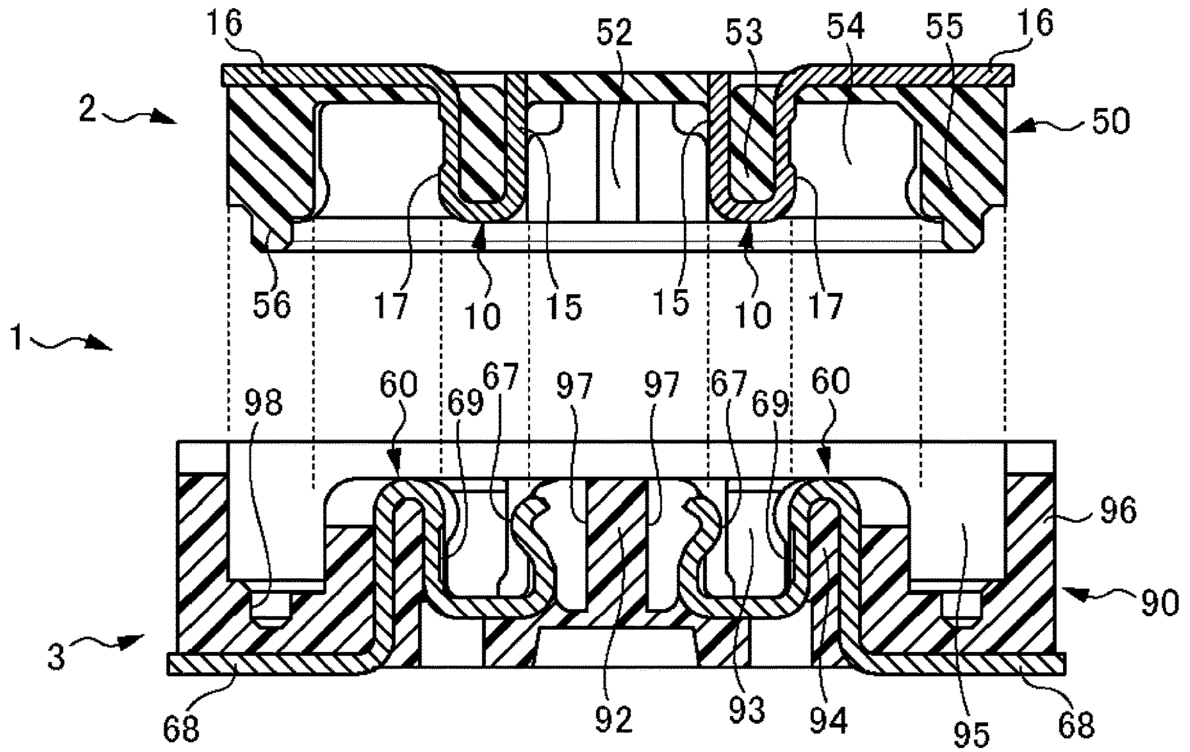
FIGS. 17A to 17C are views describing a positional relationship between the plug and the receptacle upon connection therebetween in the connector device of the embodiment of the present disclosure.
Figure 17B:
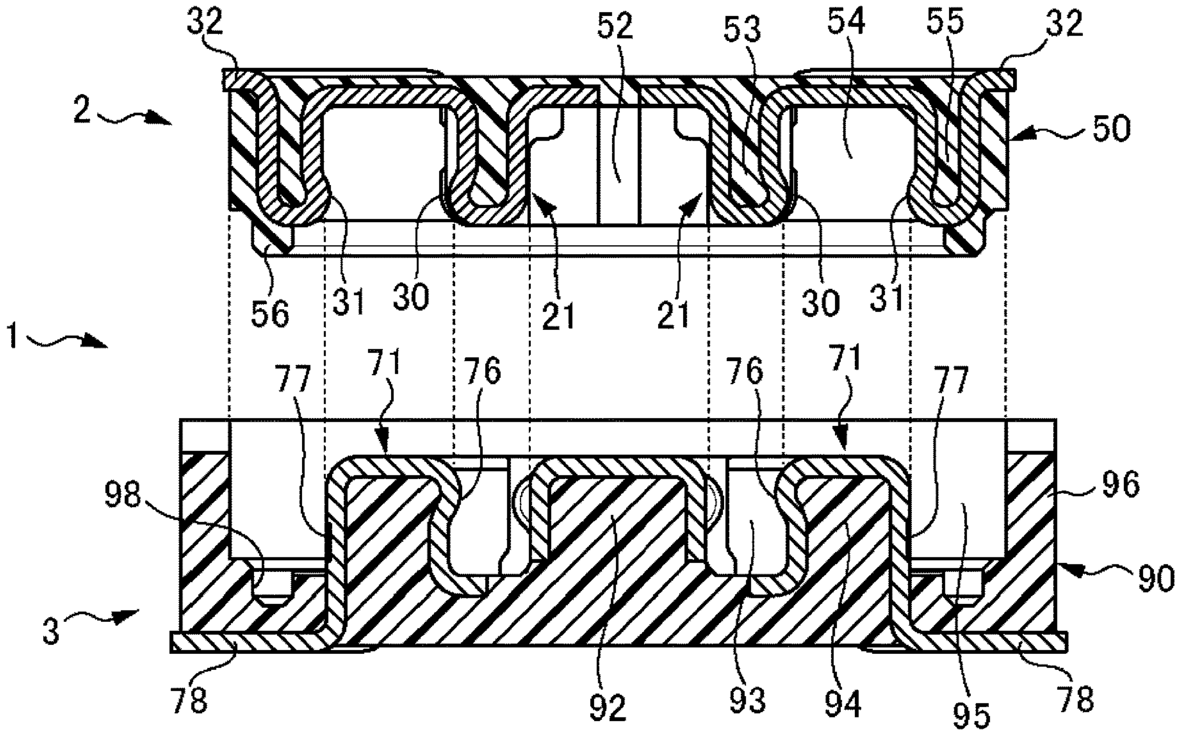
Figure 17C:
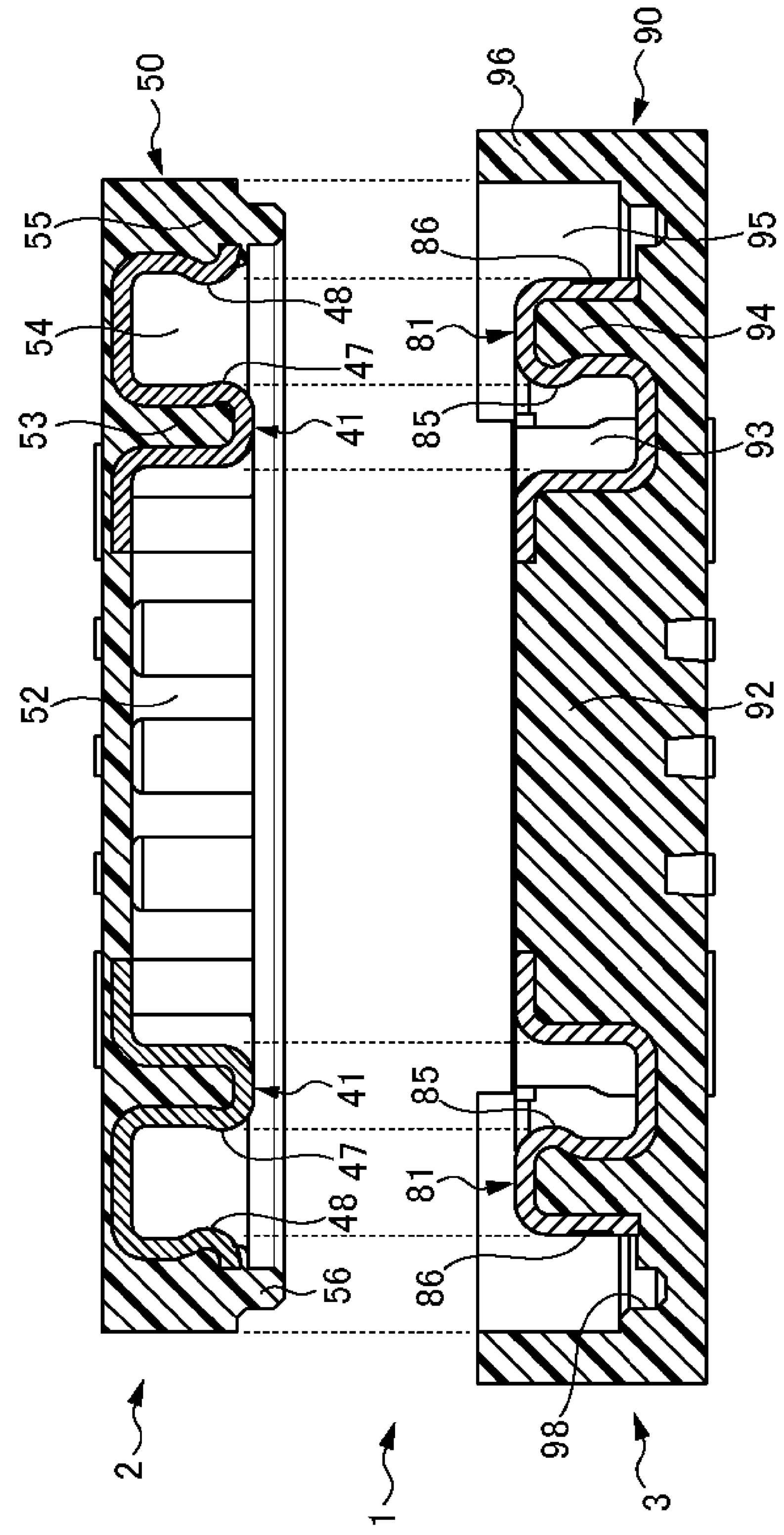

FIGS. 17A to 17C show a state immediately before the plug 2 and the receptacle 3 are connected to each other. In FIG. 17A, the section of the plug 2 is the section of the plug 2 of FIG. 3 along the cut line VI-VI, and the section of the receptacle 3 is the section of the receptacle 3 of FIG. 10 along the cut line XIII-XIII In FIG. 17B, the section of the plug 2 is the section of the plug 2 of FIG. 3 along the cut line VIII-VIII, and the section of the receptacle 3 is the section of the receptacle 3 of FIG. 10 along the cut line XV-XV. In FIG. 17C, the section of the plug 2 is the section of the plug 2 of FIG. 3 along the cut line IX-IX, and the section of the receptacle 3 is the section of the receptacle 3 of FIG. 10 along the cut line XVI-XVI. Moreover, the plug 2 in FIGS. 17A to 17C is in a vertically-inverted state.

As shown in FIGS. 17A to 17C, the plug 2 and the receptacle 3 are connected to each other in such a manner that an upper portion of the housing 50 of the plug 2 and an upper portion of the housing 90 of the receptacle 3 are faced and fitted to each other. When the plug 2 and the receptacle 3 are connected to each other, the inner protruding portion 92 of the housing 90 of the receptacle 3 enters the inner space 52 of the housing 50 of the plug 2, the inner protruding portion 53 of the housing 50 of the plug 2 enters the inner space 93 of the housing 90 of the receptacle 3, the outer protruding portion 94 of the housing 90 of the receptacle 3 enters the outer space 54 of the housing 50 of the plug 2, and the outer protruding portion 55 of the housing 50 of the plug 2 enters the outer space 95 of the housing 90 of the receptacle 3.

In FIG. 17A, the inner protruding portion 53 of the housing 50 of the plug 2 enters the inner space 93 of the housing 90 of the receptacle 3. Accordingly, the contact portions 15 of the six terminals 10 of the plug 2 and the contact portions 67 of the six terminals 60 of the receptacle 3 contact each other with the contact portions 15 and the contact portions 67 facing each other in the up-down direction. In this manner, the circuit 122 on the board 121 on which the plug 2 is mounted and the circuit 132 on the board 131 on which the receptacle 3 is mounted are electrically connected to each other. At the same time, the lock portion 17 of each terminal 10 of the plug 2 is locked to the lock portion 69 of a corresponding one of the terminals 60 of the receptacle 3. In this manner, a state of a corresponding pair of terminal 10 and terminal 60 contacting each other is held.

In FIG. 17B, the outer protruding portion 94 of the housing 90 of the receptacle 3 enters the outer space 54 of the housing 50 of the plug 2, and accordingly, the inner lock portion 30 of each front-back lock member 21 of the plug 2 is locked to the inner lock portion 76 of a corresponding one of the front-back lock members 71 of the receptacle 3. At the same time, the outer lock portion 31 of each front-back lock member 21 of the plug 2 and the outer lock portion 77 of a corresponding one of the front-back lock members 71 of the receptacle 3 are locked to each other. In this manner, the back left portion, front left portion, back right portion, and front right portion of the plug 2 and the back left portion, front left portion, back right portion, and front right portion of the receptacle 3 are locked to each other.

In FIG. 17C, the outer protruding portion 94 of the housing 90 of the receptacle 3 enters the outer space 54 of the housing 50 of the plug 2, and accordingly, the inner lock portion 47 of each right-left lock member 41 of the plug 2 and the inner lock portion 85 of a corresponding one of the right-left lock members 81 of the receptacle 3 are locked to each other. At the same time, the outer lock portion 48 of each right-left lock member 41 of the plug 2 and the outer lock portion 86 of a corresponding one of the right-left lock members 81 of the receptacle 3 are locked to each other. In this manner, the left and right portions of the plug 2 and the left and right portions of the receptacle 3 are locked to each other.

In FIGS. 17B and 17C, when the outer protruding portion 55 of the housing 50 of the plug 2 enters the outer space 95 of the housing 90 of the receptacle 3, the peripheral edge protruding portion 56 of the plug 2 enters the peripheral edge groove 98 of the receptacle 3. In this manner, a portion between a peripheral edge portion of the housing 50 of the plug 2 and a peripheral edge portion of the housing 90 of the receptacle 3 (specifically, between the peripheral edge protruding portion 56 and the peripheral edge groove 98 or between the outer protruding portion 55 and the peripheral wall portion 96) can be closed liquid-tightly. Since the portion between the peripheral edge portion of the housing 50 and the peripheral edge portion of the housing 90 is closed liquid-tightly, entrance of liquid or a liquid substance such as a potting agent into a region inside the peripheral edge protruding portion 56 in the housing 50 of the plug 2 and a region inside the peripheral edge groove 98 in the housing 90 of the receptacle 3 from the outside of the housings 50, 90 can be reduced after the plug 2 and the receptacle 3 are connected to each other.

As described above, in the connector device 1 of the embodiment of the present disclosure, the front-back lock member 21 of the plug 2 has the inner lock portion 30 arranged on the outer surface of the inner protruding portion 53 of the housing 50 of the plug 2 and the outer lock portion 31 arranged on the inner surface of the outer protruding portion 55 of the housing 50. Moreover, the front-back lock member 71 of the receptacle 3 has the inner lock portion 76 arranged on the inner surface of the outer protruding portion 94 of the housing 90 of the receptacle 3 and the outer lock portion 77 arranged on the outer surface of the outer protruding portion 94 of the housing 90. When the plug 2 and the receptacle 3 are connected to each other, the inner lock portion 30 of the front-back lock member 21 of the plug 2 and the inner lock portion 76 of the front-back lock member 71 of the receptacle 3 are locked to each other, and the outer lock portion 31 of the front-back lock member 21 of the plug 2 and the outer lock portion 77 of the front-back lock member 71 of the receptacle 3 are locked to each other. With this configuration, according to the connector device 1 of the present embodiment, the strength of lock between the plug 2 and the receptacle 3 can be enhanced as compared to a typical connector device.

Specifically, as shown in FIG. 5 of JP-A-2016-149374, in a typical connector device described in JP-A-2016-149374, when a plug connector (2) and a receptacle connector (1) are connected to each other, a lock target step portion (71A) of a plug lock fitting (70) arranged on an outer surface of a protruding portion of a housing (50) of the plug connector (2) and a lock recessed portion (35A) of a receptacle lock fitting (30) arranged on an inner surface of an outer peripheral protruding portion of a housing (10) of the receptacle connector (1) are locked to each other. In this locking structure of the typical connector device, only the inner surface of the outer protruding portion of the housing of the receptacle is joined to the housing of the plug via the lock member. On the other hand, in the connector device 1 of the present embodiment, when the plug 2 and the receptacle 3 are connected to each other, the inner lock portion 30 arranged on the outer surface of the inner protruding portion 53 of the housing 50 of the plug 2 and the inner lock portion 76 arranged on the inner surface of the outer protruding portion 94 of the housing 90 of the receptacle 3 are locked to each other. At the same time, the outer lock portion 31 arranged on the inner surface of the outer protruding portion 55 of the housing 50 of the plug 2 and the outer lock portion 77 arranged on the outer surface of the outer protruding portion 94 of the housing 90 of the receptacle 3 are locked to each other. As described above, in the locking structure of the connector device 1 of the present embodiment, both the inner and outer surfaces of the outer protruding portion 94 of the housing 90 of the receptacle 3 are joined to the housing 50 of the plug 2 via the lock members. When the strength of joint between the plug and the receptacle is compared between two locking structures: the locking structure of the typical connector device in which only the inner surface of the outer protruding portion of the housing of the receptacle is joined to the housing of the plug via the lock member; and the locking structure of the connector device 1 of the present embodiment in which both the inner and outer surfaces of the outer protruding portion of the housing of the receptacle are joined to the housing of the plug via the lock members, the strength of joint of the latter structure is greater than that of the former structure. Thus, according to the connector device 1 of the present embodiment, the strength of lock between the plug 2 and the receptacle 3 can be enhanced as compared to the typical connector device.

In the connector device 1 of the present embodiment, the front-back lock member 21 of the plug 2 is formed of the metal plate held on the housing 50 of the plug 2. The front-back lock member 21 has the outer extending portion 22 extending, between the inner surface of the outer protruding portion 55 of the housing 50 of the plug 2 and the outer surface of the inner protruding portion 53 of the housing 50 of the plug 2, from the outside to the inside on the upper surface 51B of the bottom plate portion 51, the inner upwardly-extending portion 23 extending upward on the outer surface of the inner protruding portion 53, and the outer upwardly-extending portion 26 extending upward on the inner surface of the outer protruding portion 55. The inner lock portion 30 is provided at the inner upwardly-extending portion 23, and the outer lock portion 31 is provided at the outer upwardly-extending portion 26. With this configuration, the front-back lock member 21 can be formed of the single metal plate curved in a U-shape or a backwards C-shape along the outer surface of the inner protruding portion 53, the upper surface 51B of the bottom plate portion 51, and the inner surface of the outer protruding portion 55. Thus, the strength of the front-back lock member 21 can be enhanced, and the strength of joint between the front-back lock member 21 and the housing 50 can be enhanced in the plug 2 formed by insert molding. Moreover, upon insert molding, the front-back lock member 21 can be easily attached to the die.

The front-back lock member 21 of the plug 2 has the outer downwardly-extending portion 28 embedded in the outer protruding portion 55 of the housing 50 of the plug 2. With this configuration, the strength of joint between the front-back lock member 21 and the housing 50 can be further enhanced.

The front-back lock member 21 of the plug 2 further has the lower extending portion 29 extending on the lower surface 51A of the housing 50 of the plug 2 and connected to the mount surface 121A of the board 121. With this configuration, the plug 2 can be firmly fixed to the mount surface 121A of the board 121 via the lower extending portion 29 (connection portion 32), and the front-back lock member 21 can be utilized as a terminal.

In the connector device 1 of the present embodiment, the front-back lock member 71 of the receptacle 3 is formed of the metal plate held on the housing 90 of the receptacle 3. The front-back lock member 71 has the outer extending portion 72 extending from the outside to the inside on the upper surface of the outer protruding portion 94 of the housing 90 of the receptacle 3, the inner downwardly-extending portion 73 extending downward on the inner surface of the outer protruding portion 94, and the outer downwardly-extending portion 74 extending downward on the outer surface of the outer protruding portion 94. The inner lock portion 76 is provided at the inner downwardly-extending portion 73, and the outer lock portion 77 is provided at the outer downwardly-extending portion 74. With this configuration, the front-back lock member 71 can be formed of the metal plate curved in a U-shape or a backwards C-shape along the inner surface of the outer protruding portion 94, the upper surface of the outer protruding portion 94, and the outer surface of the outer protruding portion 94. Thus, the strength of the front-back lock member 71 can be enhanced, and in the receptacle 3 formed by insert molding, the strength of joint between the front-back lock member 71 and the housing 90 can be enhanced. Moreover, upon insert molding, the front-back lock member 71 can be easily attached to the die.

The front-back lock member 71 of the receptacle 3 further has the lower extending portion 75 extending on the lower surface of the housing 90 and connected to the mount surface 131A of the board 131. With this configuration, the receptacle 3 can be firmly fixed to the mount surface 131A of the board 131 via the lower extending portion 75 (connection portion 78), and the front-back lock member 71 can be utilized as a terminal.

In the connector device 1 of the present disclosure, the plug 2 has the four front-back lock members 21. Of these front-back lock members 21, the two front-back lock members 21 are provided at the positions at the back of the inner space 52 in the outer space 54 of the housing 50, and the remaining two front-back lock members 21 are provided at the positions at the front of the inner space 52 in the outer space 54. The receptacle 3 has the four front-back lock members 71. Of these front-back lock members 71, the two front-back lock members 71 are provided at the positions at the back of the inner protruding portion 92 at the outer protruding portion 94 of the housing 90, and the remaining two front-back lock members 71 are provided at the positions at the front of the inner protruding portion 92 at the outer protruding portion 94. With this configuration, each front-back lock member 21 of the plug 2 is locked to a corresponding one of the front-back lock members 71 of the receptacle 3 so that the back portion of the plug 2 and the back portion of the receptacle 3 can be retained and the front portion of the plug 2 and the front portion of the receptacle 3 can be retained. Thus, in a state in which the plug 2 and the receptacle 3 are connected to each other, even when a force of separating the back portion of the plug 2 and the back portion of the receptacle 3 from each other is applied to the connector device 1 or when a force of separating the front portion of the plug 2 and the front portion of the receptacle 3 from each other is applied to the connector device 1, the state in which the plug 2 and the receptacle 3 are connected to each other can be held against such force, and the strength of lock between the plug 2 and the receptacle 3 can be enhanced.

In the connector device 1 of the present disclosure, the plug 2 has the four right-left lock members 41. Of these right-left lock members 41, the two right-left lock members 41 are provided at the positions at the left of the inner space 52 in the outer space 54 of the housing 50, and the remaining two right-left lock members 41 are provided at the positions at the right of the inner space 52 in the outer space 54. The receptacle 3 has the two right-left lock members 81. Of these right-left lock members 81, one right-left lock member 81 is provided at the position at the left of the inner protruding portion 92 at the outer protruding portion 94 of the housing 90, and the other right-left lock member 81 is provided at the position at the right of the inner protruding portion 92 at the outer protruding portion 94. With this configuration, each right-left lock member 41 of the plug 2 is locked to a corresponding one of the right-left lock members 81 of the receptacle 3 so that the left portion of the plug 2 and the left portion of the receptacle 3 can be retained and the right portion of the plug 2 and the right portion of the receptacle 3 can be retained. Thus, in a state in which the plug 2 and the receptacle 3 are connected to each other, even when a force of separating the left portion of the plug 2 and the left portion of the receptacle 3 from each other is applied to the connector device 1 or a force of separating the right portion of the plug 2 and the right portion of the receptacle 3 from each other is applied to the connector device 1, the state in which the plug 2 and the receptacle 3 are connected to each other can be held against such force, and the strength of lock between the plug 2 and the receptacle 3 can be enhanced.

In the plug 2, each front-back lock member 21 is provided at the portion extending in the right-left direction in the outer space 54, and each right-left lock member 41 is provided at the portion extending in the front-back direction in the outer space 54. In the receptacle 3, each front-back lock member 71 is provided at the portion extending in the right-left direction at the outer protruding portion 94, and each right-left lock member 81 is provided at the portion extending in the front-back direction at the outer protruding portion 94. By connection between the plug 2 and the receptacle 3, the front-back lock members 21 and right-left lock members 41 of the plug 2 and the front-back lock members 71 and right-left lock members 81 of the receptacle 3 are locked to each other. With this configuration, in a state in which the board 121 and the board 131 are connected to each other via the connector device 1, even when, e.g., a force of tilting the board 121 in the front-back direction with respect to the board 131 is applied or a force of tilting the board 121 in the right-left direction with respect to the board 131 is applied, the state in which the plug 2 and the receptacle 3 are connected to each other can be held against such force, and the strength of lock between the plug 2 and the receptacle 3 can be enhanced.

In the connector device 1 of the present embodiment, the plug 2 includes the combination lock members 20 each of which is configured such that the front-back lock member 21 and the right-left lock member 41 are coupled to each other, and the combination lock member 20 is formed of a single metal plate. Since the front-back lock member 21 and the right-left lock member 41 are integrated, the strength of each of the front-back lock member 21 and the right-left lock member 41 can be enhanced, and the number of components to be attached to the die upon insert molding of the plug 2 can be reduced. The receptacle 3 includes the combination lock members 70 each of which is configured such that the front-back lock member 71 and the right-left lock member 81 are coupled to each other, and the combination lock member 70 is formed of a single metal plate. Since the front-back lock member 71 and the right-left lock member 81 are integrated, the strength of each of the front-back lock member 71 and the right-left lock member 81 can be enhanced, and the number of components to be attached to the die upon insert molding of the receptacle 3 can be reduced.

In the combination lock member 70 of the receptacle 3, the coupling portion 89 coupling the front-back lock member 71 and the right-left lock member 81 to each other extends on the outer surface of the corner portion of the outer protruding portion 55 of the housing 90 of the receptacle 3. With this configuration, when the combination lock member is attached to the die upon insert molding of the receptacle 3, the outer surface of the coupling portion 89 can contact the surface of the die, and the combination lock member 70 can be reliably fixed to the die.

Note that as in the front-back lock member 21, the right-left lock member 41 of the plug 2 may be provided with an outermost extending portion, an outer downwardly-extending portion, and a lower extending portion. As in the front-back lock member 71, the right-left lock member 81 of the receptacle 3 may be provided with a lower extending portion.

In the plug 2, a front edge portion of the right-left lock member 41 of the back left combination lock member 20 and a back edge portion of the right-left lock member 41 of the front left combination lock member 20 may be joined to each other to integrate the back left combination lock member 20 and the front left combination lock member 20 with each other. Similarly, the back right combination lock member 20 and the front right combination lock member 20 may be integrated with each other.

In the plug 2 or the receptacle 3, the front-back lock member and the right-left lock member are not necessarily coupled to each other. In the plug 2 or the receptacle 3, the lock member may only be the front-back lock member or the right-left lock member. In the plug 2 or the receptacle 3, the number of front-back lock members or right-left lock members may be increased or decreased. In the plug 2 or the receptacle 3, the number of terminals is not limited. In the receptacle 3, the peripheral wall portion 96 is not necessarily provided.

The present disclosure is changeable as necessary without departing from the gist or idea of the disclosure which can be interpreted from the claims and the entire specification, and connector devices with these changes are also included in the technical idea of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector device comprising:

a first connector; and a second connector connected to the first connector, wherein the first connector includes a first terminal, a first lock member, and a first housing, the second connector includes a second terminal, a second lock member, and a second housing, the first housing has a first plate portion, a first inner protruding portion protruding upward from the first plate portion, a first outer protruding portion protruding upward from the first plate portion and surrounding the first inner protruding portion, a first inner space surrounded by the first inner protruding portion, and a first outer space between the first inner protruding portion and the first outer protruding portion, the second housing has a second plate portion, a second inner protruding portion protruding upward from the second plate portion, a second outer protruding portion protruding upward from the second plate portion and surrounding the second inner protruding portion, and a second inner space between the second inner protruding portion and the second outer protruding portion, when the first connector and the second connector are connected to each other, the second inner protruding portion enters the first inner space, the first inner protruding portion enters the second inner space, and the second outer protruding portion enters the first outer space, one end portion of the first terminal is arranged on the first inner protruding portion, and another end portion of the first terminal is arranged on the first plate portion, one end portion of the second terminal is arranged in the second inner space, and another end portion of the second terminal is arranged on the second plate portion, the first lock member has a first inner lock portion arranged on an outer surface of the first inner protruding portion and a first outer lock portion arranged on an inner surface of the first outer protruding portion, and the second lock member has a second inner lock portion arranged on an inner surface of the second outer protruding portion and locked to the first inner lock portion and a second outer lock portion arranged on an outer surface of the second outer protruding portion and locked to the first outer lock portion.

2. The connector device according to claim 1, wherein the first lock member is formed of a metal plate held on the first housing, the first lock member has a first outer extending portion extending, between the inner surface of the first outer protruding portion and the outer surface of the first inner protruding portion, from an outside to an inside on an upper surface of the first plate portion, a first inner upwardly-extending portion extending upward from an inner end portion of the first outer extending portion on the outer surface of the first inner protruding portion, and a first outer upwardly-extending portion extending upward from an outer end portion of the first outer extending portion on the inner surface of the first outer protruding portion, and the first inner lock portion is provided at the first inner upwardly-extending portion, and the first outer lock portion is provided at the first outer upwardly-extending portion.

3. The connector device according to claim 2, wherein the first lock member further has a first outermost extending portion extending from the inside to the outside from an upper end portion of the first outer upwardly-extending portion on an upper surface of the first outer protruding portion or in the first outer protruding portion, a first outer downwardly-extending portion extending downward from an outer end portion of the first outermost extending portion to a lower surface of the first plate portion in the first outer protruding portion, and a first lower extending portion extending from a lower end portion of the first outer downwardly-extending portion on the lower surface of the first plate portion.

4. The connector device according to claim 1, wherein the second lock member is formed of a metal plate held on the second housing, the second lock member has a second outer extending portion extending from an outside to an inside on an upper surface of the second outer protruding portion, a second inner downwardly-extending portion extending downward from an inner end portion of the second outer extending portion on the inner surface of the second outer protruding portion, and a second outer downwardly-extending portion extending downward from an outer end portion of the second outer extending portion on the outer surface of the second outer protruding portion, and the second inner lock portion is provided at the second inner downwardly-extending portion, and the second outer lock portion is provided at the second outer downwardly-extending portion.

5. The connector device according to claim 4, wherein the second lock member further has a second lower extending portion extending on a lower surface of the second plate portion after having extended from a lower end portion of the second outer downwardly-extending portion to the lower surface of the second plate portion.

6. The connector device according to claim 1, wherein the first connector includes a plurality of the first lock members, one of the plurality of the first lock members is provided at a position on one side of the first inner space in the first outer space, and another one of the plurality of the first lock members is provided at a position on another side of the first inner space in the first outer space, and the second connector includes a plurality of the second lock members, one of the plurality of the second lock members is provided at a position on one side of the second inner protruding portion at the second outer protruding portion, and another one of the plurality of the second lock members is provided at a position on another side of the second inner protruding portion at the second outer protruding portion.

7. The connector device according to claim 1, wherein the first connector includes a plurality of the first lock members, one of the plurality of the first lock members is provided at a portion extending in a right-left direction in the first outer space, and another one of the plurality of the first lock members is provided at a portion extending in a front-back direction in the first outer space, and the second connector includes a plurality of the second lock members, one of the plurality of the second lock members is provided at a portion extending in the right-left direction at the second outer protruding portion, and the another one of the plurality of the second lock members is provided at a portion extending in the front-back direction at the second outer protruding portion.

8. The connector device according to claim 7, wherein the first connector includes a first combination lock member configured such that the one of the plurality of the first lock members and the another one of the plurality of the first lock members are coupled to each other, and the first combination lock member is formed of a single metal plate.

9. The connector device according to claim 7, wherein the second connector includes a second combination lock member configured such that the one of the plurality of the second lock members and the another one of the plurality of the second lock members are coupled to each other, and the second combination lock member is formed of a single metal plate.

10. The connector device according to claim 9, wherein the second combination lock member has a coupling portion coupling the one of the plurality of the second lock members and the another one of the plurality of the second lock members to each other, and the coupling portion extends on an outer surface of a corner portion of the second outer protruding portion.

* * * * *